US012151297B2

(12) United States Patent
Perlade et al.

(10) Patent No.: US 12,151,297 B2
(45) Date of Patent: *Nov. 26, 2024

(54) PRODUCTION METHOD FOR A SPOT WELDED JOINT USING HIGH STRENGTH AND HIGH FORMING STEEL

(71) Applicant: ArcelorMittal, Luxembourg (LU)

(72) Inventors: Astrid Perlade, Le Ban-Saint-Martin (FR); Samuel Vignier, Pont Astier (FR); Frederic Kegel, Maizieres-les-Mets (FR); Artem Arlazarov, Maizieres-les-Mets (FR)

(73) Assignee: ArcelorMittal, Luxembourg (LU)

( * ) Notice: Subject to any disclaimer, the term of this patent is extended or adjusted under 35 U.S.C. 154(b) by 112 days.

This patent is subject to a terminal disclaimer.

(21) Appl. No.: 17/961,877

(22) Filed: Oct. 7, 2022

(65) Prior Publication Data
US 2023/0050317 A1 Feb. 16, 2023

Related U.S. Application Data

(60) Division of application No. 16/293,264, filed on Mar. 5, 2019, now Pat. No. 11,504,795, which is a continuation of application No. 14/907,429, filed as application No. PCT/IB2014/001366 on Jul. 22, 2014, now Pat. No. 10,272,514.

(51) Int. Cl.
| B23K 11/11 | (2006.01) |
| B22D 11/00 | (2006.01) |
| C21D 6/00 | (2006.01) |
| C21D 8/02 | (2006.01) |
| C21D 8/04 | (2006.01) |
| C21D 9/46 | (2006.01) |
| C21D 9/50 | (2006.01) |
| C22C 38/00 | (2006.01) |
| C22C 38/02 | (2006.01) |
| C22C 38/04 | (2006.01) |
| C22C 38/06 | (2006.01) |
| C22C 38/12 | (2006.01) |
| C23C 2/06 | (2006.01) |
| C23C 2/12 | (2006.01) |
| B23K 11/16 | (2006.01) |
| B23K 101/18 | (2006.01) |
| B23K 101/34 | (2006.01) |
| B23K 103/04 | (2006.01) |
| C22C 38/14 | (2006.01) |

(52) U.S. Cl.
CPC ............ *B23K 11/11* (2013.01); *B22D 11/001* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C21D 8/0436* (2013.01); *C21D 9/46* (2013.01); *C21D 9/50* (2013.01); *C22C 38/002* (2013.01); *C22C 38/02* (2013.01); *C22C 38/04* (2013.01); *C22C 38/06* (2013.01); *C22C 38/12* (2013.01); *C23C 2/06* (2013.01); *C23C 2/12* (2013.01); *B23K 11/166* (2013.01); *B23K 2101/18* (2018.08); *B23K 2101/34* (2018.08); *B23K 2103/04* (2018.08); *C21D 9/505* (2013.01); *C21D 2211/001* (2013.01); *C21D 2211/005* (2013.01); *C21D 2211/008* (2013.01); *C22C 38/14* (2013.01)

(58) Field of Classification Search
CPC ...................................................... B23K 11/11
See application file for complete search history.

(56) References Cited

U.S. PATENT DOCUMENTS

| 7,926,428 | B2 | 4/2011 | Schorr et al. |
| 9,109,273 | B2 | 8/2015 | Jin et al. |
| 9,580,779 | B2 | 2/2017 | Kawasaki et al. |
| 9,610,648 | B2 | 4/2017 | Oikawa et al. |
| 9,737,955 | B2 | 8/2017 | Taniguchi et al. |
| 9,758,848 | B2 | 9/2017 | Kawasaki et al. |
| 10,081,073 | B2 | 9/2018 | Watanabe et al. |
| 10,272,514 | B2 | 4/2019 | Perlade et al. |

(Continued)

FOREIGN PATENT DOCUMENTS

| EP | 1987904 A1 | 11/2008 |
| EP | 2703512 A1 | 3/2014 |
| JP | 5070866 B2 | 11/2012 |

(Continued)

OTHER PUBLICATIONS

W.-C. Cheng et al.: "The role carbon plays in the martensic phase transformation of an Fe—Mn—Al alloy,", Scripta Mater., (2003), vol. 48, pp. 295-300, received Mar. 11, 2002.

(Continued)

*Primary Examiner* — Christopher S Kessler
(74) *Attorney, Agent, or Firm* — Davidson Kappel LLC

(57) ABSTRACT

A spot welded joint of at least two steel sheets is provided. At least one of the steel sheets presents yield strength above or equal to 600 MPa, an ultimate tensile strength above or equal to 1000 MPa, uniform elongation above or equal to 15%. The base metal chemical composition includes $0.05 \leq C \leq 0.21\%$, $4.0 \leq Mn \leq 7.0\%$, $0.5 \leq Al \leq 3.5\%$, $Si \leq 2.0\%$, $Ti \leq 0.2\%$, $V \leq 0.2\%$, $Nb \leq 0.2\%$, $P \leq 0.025\%$, $B \leq 0.0035\%$, and the spot welded joint contains a molten zone microstructure containing more than 0.5% of Al and containing a surface fraction of segregated areas lower than 1%, said segregated areas being zones larger than 20 μm² and containing more than the steel nominal phosphorus content.

18 Claims, 14 Drawing Sheets

(56) References Cited

U.S. PATENT DOCUMENTS

| | | |
|---|---|---|
| 2012/0141829 A1 | 6/2012 | Oikawa et al. |
| 2016/0194739 A1 | 7/2016 | Del Frate et al. |

FOREIGN PATENT DOCUMENTS

| | | |
|---|---|---|
| JP | 2012237054 A | 12/2012 |
| JP | 2013076162 A | 4/2013 |
| JP | 2016529392 A | 9/2016 |
| KR | 20130006507 A | 1/2013 |
| RU | 2066264 C1 | 9/1996 |
| RU | 2175359 C1 | 10/2001 |
| RU | 2423262 C1 | 7/2011 |
| WO | 2009142362 A1 | 11/2009 |
| WO | 2012147898 A1 | 11/2012 |
| WO | 2013038637 A1 | 3/2013 |
| WO | 2013076925 A1 | 5/2013 |
| WO | 2013161937 A1 | 10/2013 |

OTHER PUBLICATIONS

Hu et al, Recent progress in Medium-Mn steels made with new designing strategies, a review; Journal of Materials Science & Technology 33 (2017), 1457-1464.

Written Opinion of the International Searching Authority for PCT/IB2014001366, Jan. 20, 2015.

Written Opinion of the International Searching Authority for PCT/IB2013/001609, Jun. 2, 2014.

Stahl-Eisen-Prufblatter (SEP) des Stahlinstituts VDEh, Aug. 1, 2011, In English.

Resistance welding—Weldability—Part 2: Alternative procedures for the assessment of sheet steels for spot welding (ISA 18278-2:2004,IDT), Nov. 2004, in English.

PRODUCTION METHOD FOR A SPOT WELDED JOINT USING HIGH STRENGTH AND HIGH FORMING STEEL

This is a Divisional of U.S. patent application Ser. No. 16/293,264 filed on Mar. 5, 2019 which is a Continuation of U.S. patent application Ser. No. 14/907,429, filed Jan. 25, 2016, now issued as U.S. Pat. No. 10,272,514 on Apr. 30, 2019, which is a National Phase Application of PCT/IB2014/001366, filed Jul. 22, 2014, which claims priority of International Patent Application PCT/IB2013/001609, filed Jul. 25, 2013, all of which are hereby incorporated by reference herein.

The present invention relates to a spot welded joint of at least two steel sheets wherein at least one of the steel sheets, presents yield strength above or equal to 600 MPa, an ultimate tensile strength above or equal to 1000 MPa, uniform elongation above or equal to 15%.

BACKGROUND

In the automotive industry in particular, there is a continuous need to lighten vehicles and to increase safety by using and by joining light steels or steels presenting high tensile strength to compensate lower thickness. Thus, several families of steels like the ones mentioned below offering various strength levels have been proposed.

Firstly, steels have been proposed that have micro-alloying elements whose hardening is obtained simultaneously by precipitation and by refinement of the grain size. The development of such steels has been followed by those of higher strength called Advanced High Strength Steels which keep good levels of strength together with good cold formability.

For the purpose of obtaining even higher tensile strength levels, steels exhibiting TRIP (Transformation Induced Plasticity) behavior with highly advantageous combinations of properties (tensile strength/deformability) have been developed. These properties are associated with the structure of such steels, which consists of a ferritic matrix containing bainite and residual austenite. The residual austenite is stabilized by an addition of silicon or aluminum, these elements retarding the precipitation of carbides in the austenite and in the bainite. The presence of residual austenite improves ductile behavior Under the effect of a subsequent deformation, for example when stressed uni-axially, the residual austenite of a part made of TRIP steel is progressively transformed to martensite, resulting in substantial hardening and delaying the appearance of necking.

To achieve an even higher tensile strength, that is to say a level greater than 800-1000 MPa, multiphase steels having a predominantly bainitic structure have been developed. In the automotive industry or in industry in general, such steels are advantageously used for structural parts such as bumper cross-members, pillars, various reinforcements and abrasion-resistant wear parts. However, the formability of these parts requires, simultaneously, a sufficient elongation, greater than 10% and not a too high yield strength/tensile strength ratio so as to have a sufficient reserve of plasticity.

All these steel sheets present relatively good balances of resistance and ductility, but new challenges appear when it comes to assemble these sheets using for instance conventional spot welding techniques. Henceforth, new concepts presenting, high strength and high formability while being weldable using existing welding techniques are needed.

So as to reduce body in white weight, European application EP1987904 aims at providing a joint product of a steel product and an aluminum material, and a spot welding method for the joint product, ensuring that spot welding with high bonding strength can be performed. In one embodiment, a steel product having a sheet thickness $t_1$ of 0.3 to 3.0 mm and an aluminum material having a sheet thickness $t_2$ of 0.5 to 4.0 mm are joined together by spot welding to form a joint product of a steel product and an aluminum product. In this joint product, the nugget area in the joint part is from $20 \times t_2^{0.5}$ to $100 \times t_2^{0.5}$ mm$^2$, the area of a portion where the thickness of the interface reaction layer is from 0.5 to 3 μm is $10 \times t_2^{0.5}$ mm$^2$ or more, and the difference between the interface, reaction layer thickness at the joint part center and the interface reaction layer thickness at a point distant from the joint part center by a distance of one-fourth of the joint diameter $D_c$ is 5 μm or less. According to this construction, there is provided a dissimilar material joint product with excellent bonding strength, which can be formed by an existing spot welding apparatus at a low cost without using other materials such as clad material. This is done without adding a separate step and a spot welding method for the dissimilar material joint product. Such a method implies welding steel sheet to an aluminum one, the joint material resistance will have a soft area on the aluminum side compared to the steel one.

US application US2012141829 comes up with a spot welded joint which includes at least one thin steel plate with a tensile strength of 750 MPa to 1850 MPa and a carbon equivalent $C_{eq}$ of equal to or more than 0.22 mass % to 0.55 mass % and in which a nugget is formed in an interface of the thin steel plates. In the nugget outer layer zone, a microstructure consists of a dendrite structure in which an average value of arm intervals is equal to or less than 12 μm, an average grain diameter of carbides contained in the microstructure is 5 nm to 100 nm, and a number density of carbides is equal to or more than $2 \times 10^6$/mm$^2$. Such application does not aim at third generation steels but conventional ones only.

BRIEF SUMMARY

None of the mentioned prior arts faced nor solved the challenge of welding steels with non-conventional amounts of alloying elements in steels, which remains unsolved.

The present invention provides a spot welded joint of at least two steel sheets, wherein at least one of the steel sheets is an aluminum alloyed steel sheet presenting:
a yield strength above or equal to 600 MPa;
a tensile strength above or equal to 1000 MPa; and
a uniform elongation above or equal to 15%.
The welded joint being characterized by:
A molten zone containing at least 0.5 wt % Al and a surface fraction of coarse segregated areas lower than 1%. The coarse segregated areas are defined as zones larger than 20 μm$^2$ containing at least the base metal nominal phosphorus content.

Optionally, a molten zone microstructure containing a density of iron carbides larger than 50 nm equal or above $2 \times 10^6$ per mm$^2$.

Optionally, a microstructure at the boundary between molten zone and the steel according to the invention does not have martensite 18R inside the ferritic grains.

Another aim of the invention is to provide a process for making such welded joint with a steel that can be easily cold rolled down to its final thickness while being compatible with usual continuous annealing lines and having a low sensitivity to process parameters.

The invention provides a spot welded joint of at least two steel sheets, with at least one of them being an aluminum alloyed steel, comprising, by weight percent:

0.05 C≤0.21%;
4.0≤Mn≤7.0%;
0.5≤Al≤3.5%;
P≤0.025%; and
B≤0.0035%.

The aluminum alloyed steel sheet may further comprise, by weight percent: Si≤2.0%; Ti≤0.2%; V≤0.2%; Nb≤0.2%; and S≤0.004%; a balance of the composition being iron and unavoidable impurities resulting from smelting.

The steel presents a yield strength above or equal to 600 MPa, an ultimate tensile strength above or equal to 1000 MPa, and uniform elongation above or equal to 15%, the microstructure of said steel contains 20% to 50% of austenite, 40% to 80% of annealed ferrite, less than 25% of martensite and wherein the spot welded joint is characterized by a molten zone microstructure containing more than 0.5% of Al and containing a surface fraction of coarse segregated areas lower than 1%. The coarse segregated areas are defined as zones larger than 20 μm² containing phosphorus in an amount superior to the steel phosphorus content.

In another preferred embodiment, said aluminum alloyed steel chemical composition has an aluminum content such that, 1.0≤Al≤3.0%, or even 1.0≤Al≤2.5%.

Preferably, said aluminum alloyed steel chemical composition has a silicon content such that, Si≤1.5% or even Si≤1.0%.

In a preferred embodiment, said aluminum alloyed steel microstructure contains between 50% and 70% of annealed ferrite.

In a preferred embodiment, said aluminum alloyed steel presents less than 20% of martensite.

Preferably, the density of iron carbides larger than 50 nm is equal or above $2 \times 10^6$ per mm² in the spot welded joint molten zone.

Preferably, the microstructure at the boundary between molten zone and the steel according to the invention does not have martensite 18R with orthorhombic needle-like phase inside the ferritic grains.

The invention also provides an assembly of two steel sheets including a spot welded joint according to the invention.

The invention further provides a process to produce the spot welded joint of at least two steel sheets, with at least one of them being an aluminum alloyed steel sheet, produced by:

Casting aluminum alloys steel which composition is according to the present invention so as to obtain a slab, Reheating the slab at a temperature $T_{reheat}$ between 1150° C. and 1300° C., Hot rolling the reheated slab with a temperature between 800° C. and 1250° C. to obtain a hot rolled steel, the last hot rolling pass taking place at a temperature $T_{lp}$ above or equal to 800° C.

Cooling the hot rolled steel between 1 and 150° C./s until a coiling temperature $T_{coiling}$ lower or equal to 650° C.

Then, coiling the hot rolled steel cooled at $T_{coiling}$.

Optionally, the hot rolled steel is batch annealed between 400° C. and 600° C. between 1 and 24 hours, or continuously annealed between 650° C. and 750° C. between 20 and 180 s.

The invention provides a process to obtain the steel directly using a casting machine where the product is immediately rolled after casting. This process is called 'Thin Slab Casting'.

Then:

Descaling the hot rolled steel sheet;

Cold rolling the steel sheet with a cold rolling ratio between 30% and 70% so as to obtain a cold rolled steel sheet;

Heating the steel sheet at a heating rate $H_{rate}$ at least equal to 1° C./s up to the annealing temperature $T_{anneal}$;

Annealing the steel at a temperature $T_{anneal}$ between $T_{min}$ and $T_{max}$ defined by $T_{min}=721-36*C-20*Mn+37*Al+2*Si$ (in ° C.);

$T_{max}=690+145*C-6.7*Mn+46*Al+9*Si$ (in ° C.);

during a time between 30 and 700 seconds:

Cooling the steel sheet at a cooling rate preferably between 5° C./s and 70° C./s;

Cutting the cold rolled steel into sheets to obtain a cold rolled steel sheet; and Welding at least one of the cold rolled steel sheets to another metal with an effective intensity between 3 kA and 15 kA and a force applied on the electrodes between 150 and 850 daN, said electrode active face diameter being between 4 and 10 mm.

Optionally, the steel sheet is cooled down at $V_{cooling2}$ to a temperature $T_{OA}$ between 350° C. and 550° C. and kept at $T_{OA}$ for a time between 10 and 300 seconds so as to be hot dip coated.

Further cooling the steel sheet at a cooling rate $V_{cooling3}$ preferably above 5° C./s and below 70° C./s down to room temperature to obtain a cold rolled and annealed steel sheet.

Optionally, the cold rolled and annealed steel is tempered at a temperature $T_{temper}$ between 170 and 400° C. for a time $t_{temper}$ between 200 and 800 s.

In a preferred embodiment, the cold rolled steel sheet according to the invention is, after annealing, coated with Zn or a Zn alloy.

In another embodiment, the cold rolled steel sheet according to the invention is after annealing coated with Al or Al alloy.

Optionally, the spot welded joint according to the invention undergoes, after the welding, a post thermal treatment which is applied with an intensity between 60% and 90% of the welding intensity for a time between 0.1 and 2 seconds.

The steel sheets or assembly of two steel sheets welded according to the invention can be used to produce car structural parts for vehicles body in white in the automotive industry.

BRIEF DESCRIPTION

Other features and advantages of the invention will appear through the following detailed description. The figures joined are given by way of examples and shall not be taken as limiting the scope of the present invention. They are such that:

Figure 17:
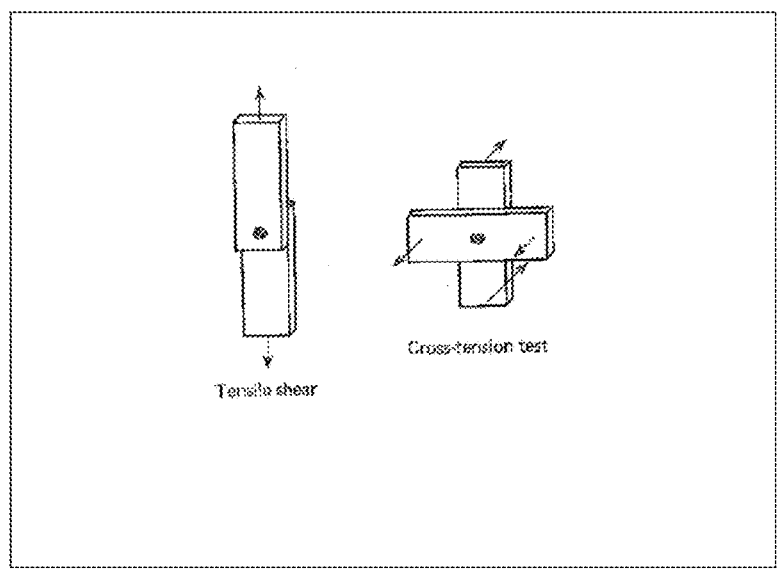
Figure 18:
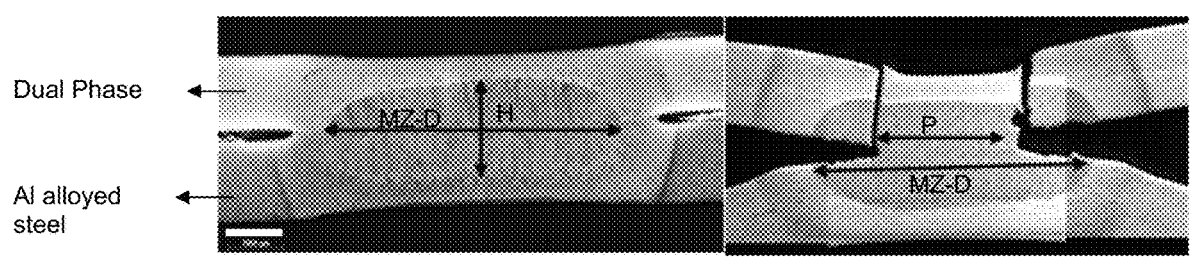
Figure 19:
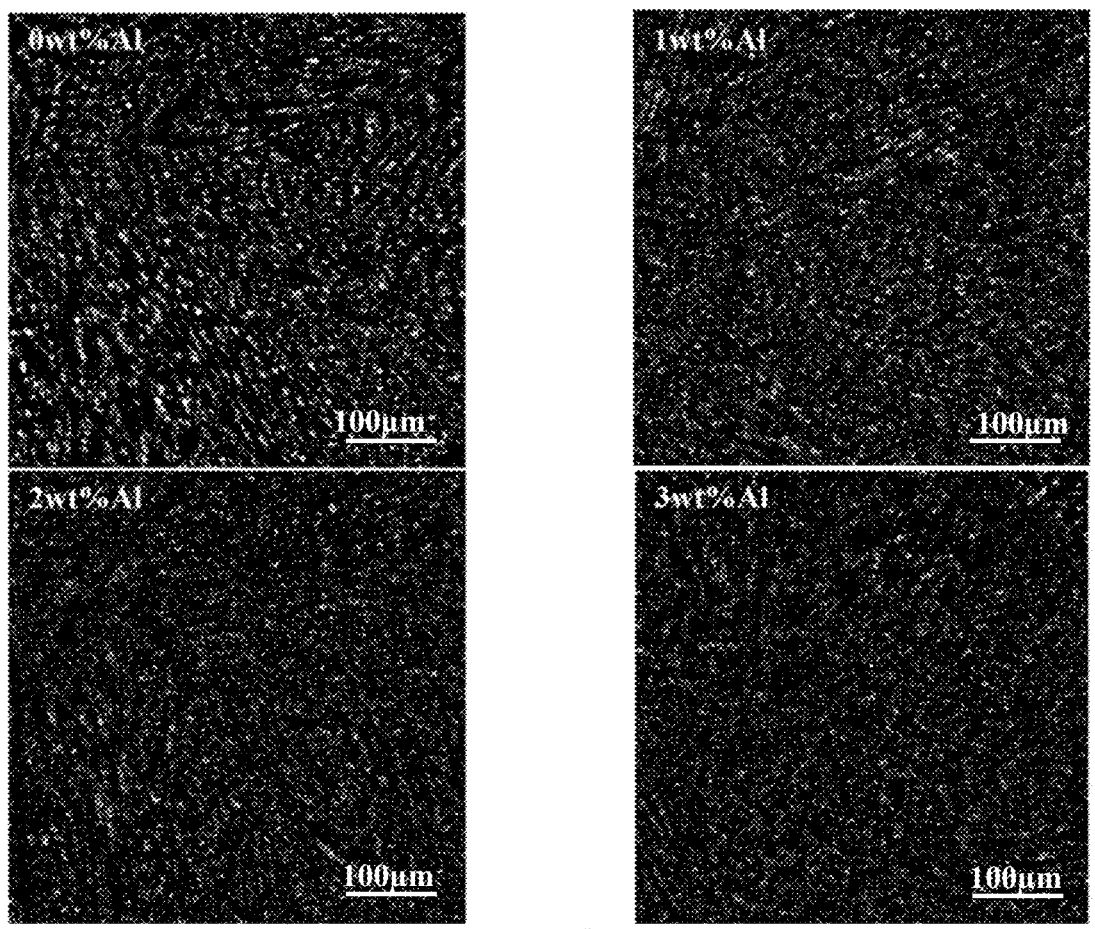
Figure 20:
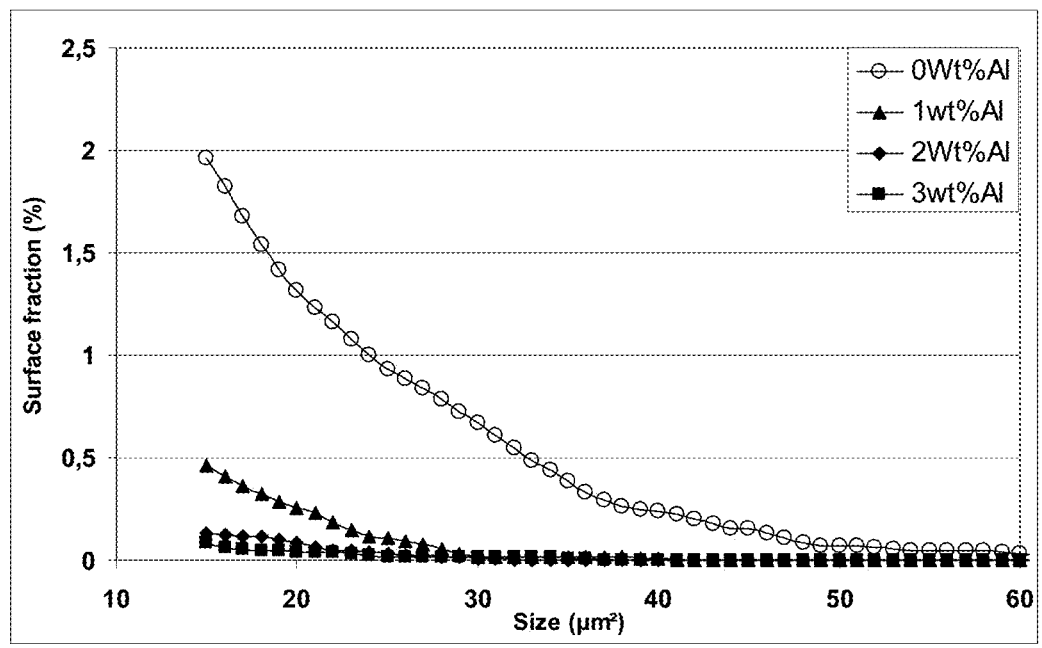
Figure 20:
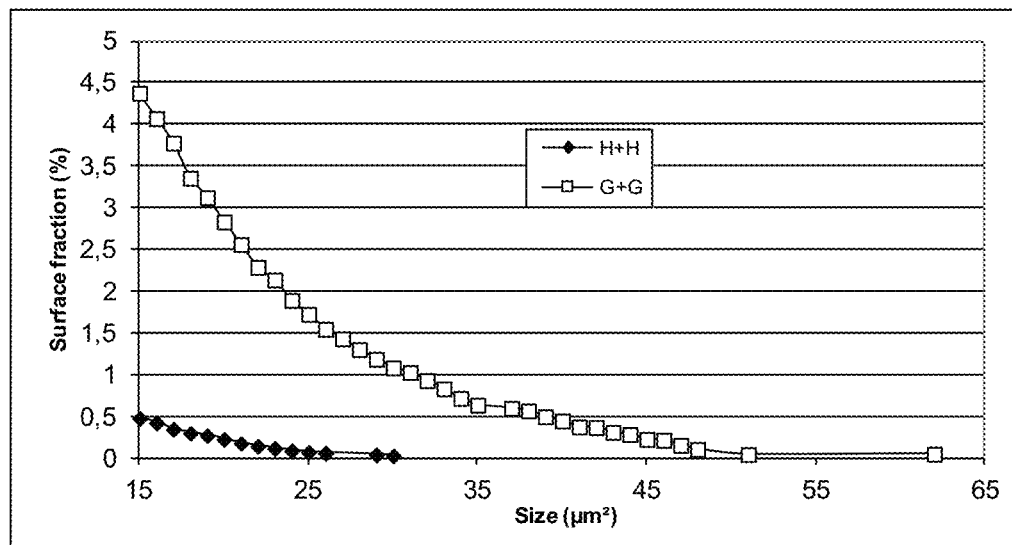
Figure 21:
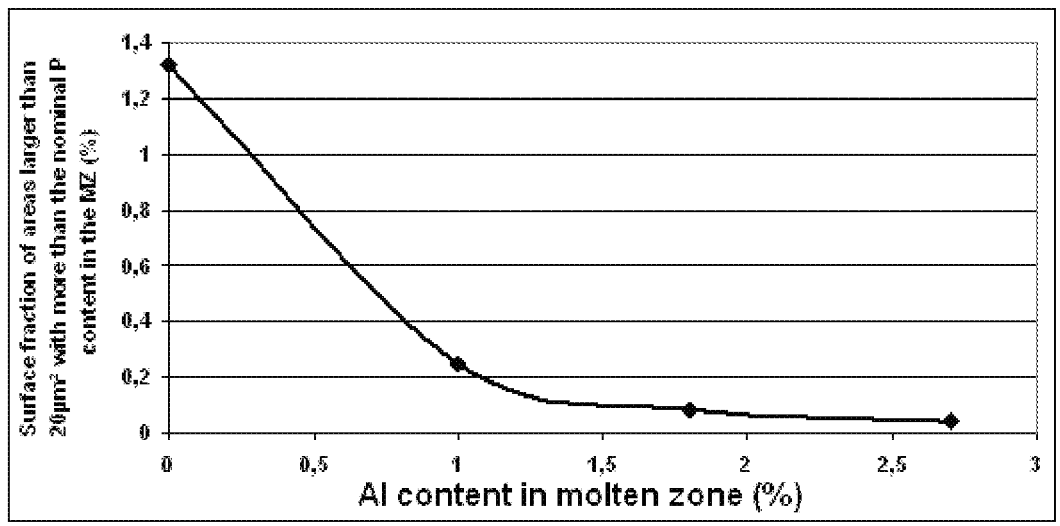

FIG. 17 gives a schematic description of Tensile Shear and Cross-tension tests used to characterize the resistance of the spot weld;

FIG. 18 gives a non limitative example of a plug ratio and a molten zone geometry between an aluminum alloyed steel according to the invention and a Dual Phase 600 (DP). H is the MZ height, PD is the Plug diameter, MZ-D is MZ diameter, where MZ means Molten zone;

FIG. 19 shows the microprobe analysis images with a threshold at the nominal P content showing the effect of Al on the P segregation for A, B, C, E;

FIGS. 20A and B illustrate the surface fraction of areas with more than the nominal P content as the function of their size, FIG. 20A being for examples A, B, C, E while FIG. 20B is for G and H;

FIG. 21 shows the evolution of the surface fraction of areas larger than 20 µm$^2$ with more than the nominal P content in the molten zone as a function of Al content for A, B, C, E; and FIGS. 22A and B illustrate the CTS coefficient as a function of Al content with and without post treatment: A for examples A, B, C, E and F in homogeneous welding and B for examples A, B, C, E and F welded with J.

DETAILED DESCRIPTION

The present invention provides a spot welded joint of two steel sheets wherein at least one of the steel sheets, called an aluminum alloyed steel, presents yield strength above or equal to 600 MPa, an ultimate tensile strength above or equal to 1000 MPa, uniform elongation above or equal to 15%. The base metal chemical composition comprising more than 0.5% of Al, being easy to weld and to cold roll to its targeted final thickness. To do so, the chemical composition is very important as well as the annealing parameters so as to reach all the objectives. Following chemical composition elements are given in weight percent.

According to the invention, the carbon content is between 0.05 and 0.21%. Carbon is a gamma-former element. It promotes, with the invention Mn content, the stabilization of austenite. Below 0.05%, the tensile strength above 1000 MPa is difficult to achieve. If the carbon content is greater than 0.21%, the cold-rollability is reduced and the weldability becomes poor. Preferably, carbon content is between 0.10 and 0.21%.

Manganese must be between 4.0% and 7.0%. This element, also austenite-stabilizer, is used to stabilize enough austenite in the microstructure. It also has a solid solution hardening and a refining effect on the microstructure. For Mn content less than 4.0%, the retained austenite fraction in the microstructure is less than 20% and the combination of the uniform elongation above 15% and the tensile strength above 1000 is not achieved. Above 7.0%, weldability becomes poor, while segregations and inclusions deteriorate the damage properties.

Figure 1:
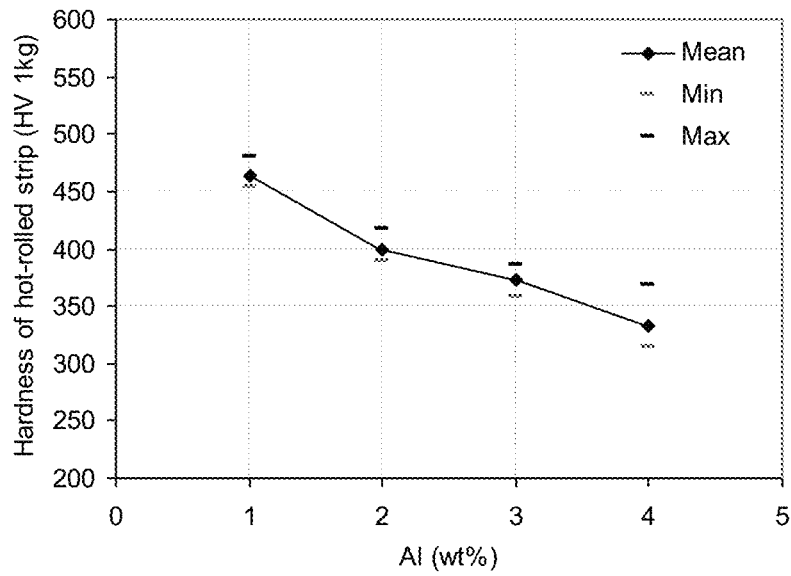
FIG. 1 illustrates the evolution of the hardness of hot rolled materials B1, C1, E1 and F1.
Figure 2:
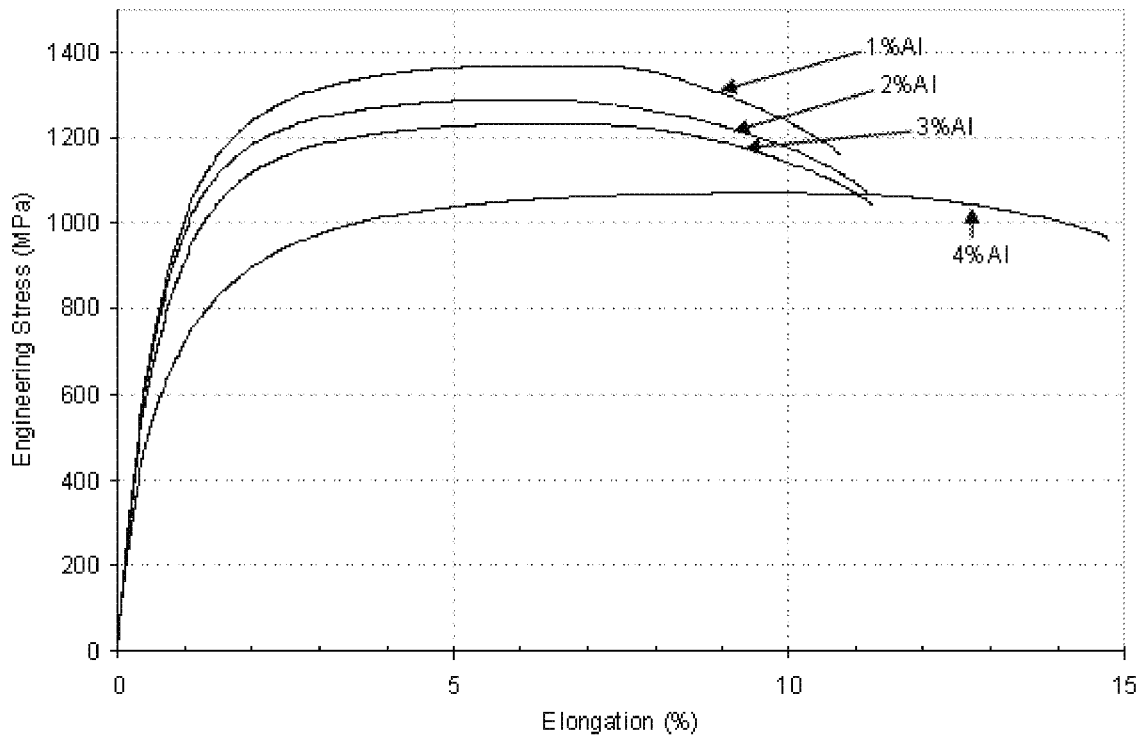
FIG. 2 illustrates the tensile properties of hot rolled materials B1, C1, E1 and F1.
Figure 3:
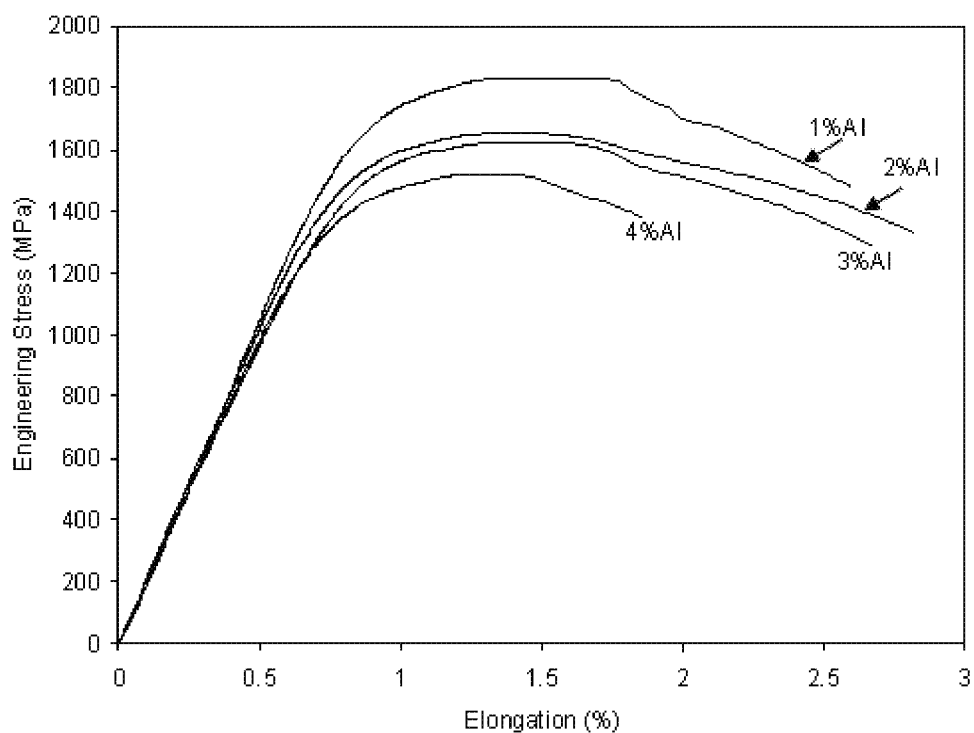
FIG. 3 illustrates the tensile properties of cold rolled materials B1, C1, E1 and F1 before annealing.
Figure 15:
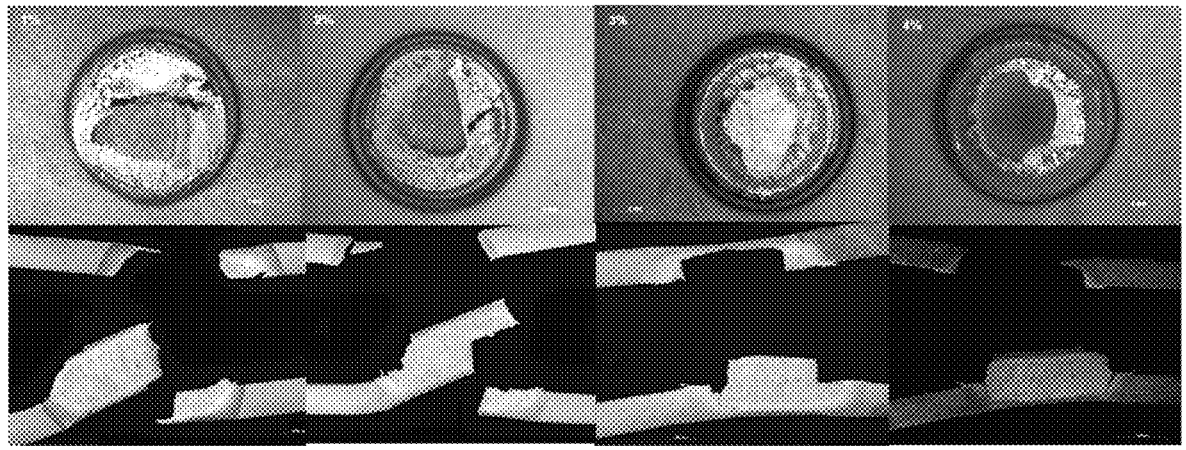
FIG. 15 shows the failure modes as a function of the Al content of an aluminum alloyed steel from 1 to 4% (left to right) for B, C, E and F.
Figure 16:
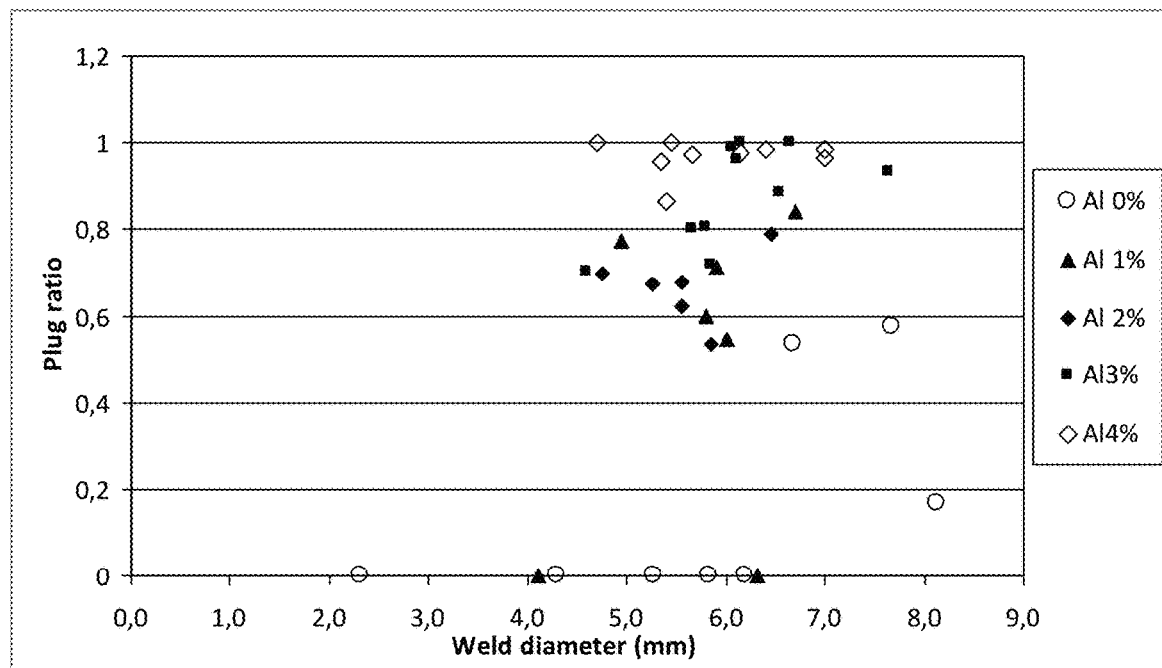
FIG. 16A shows the heterogeneous plug ratios for examples A, B, C, E and F welded with J.
FIG. 16B shows the homogeneous plug ratios, for examples G and H.
Figure 16:
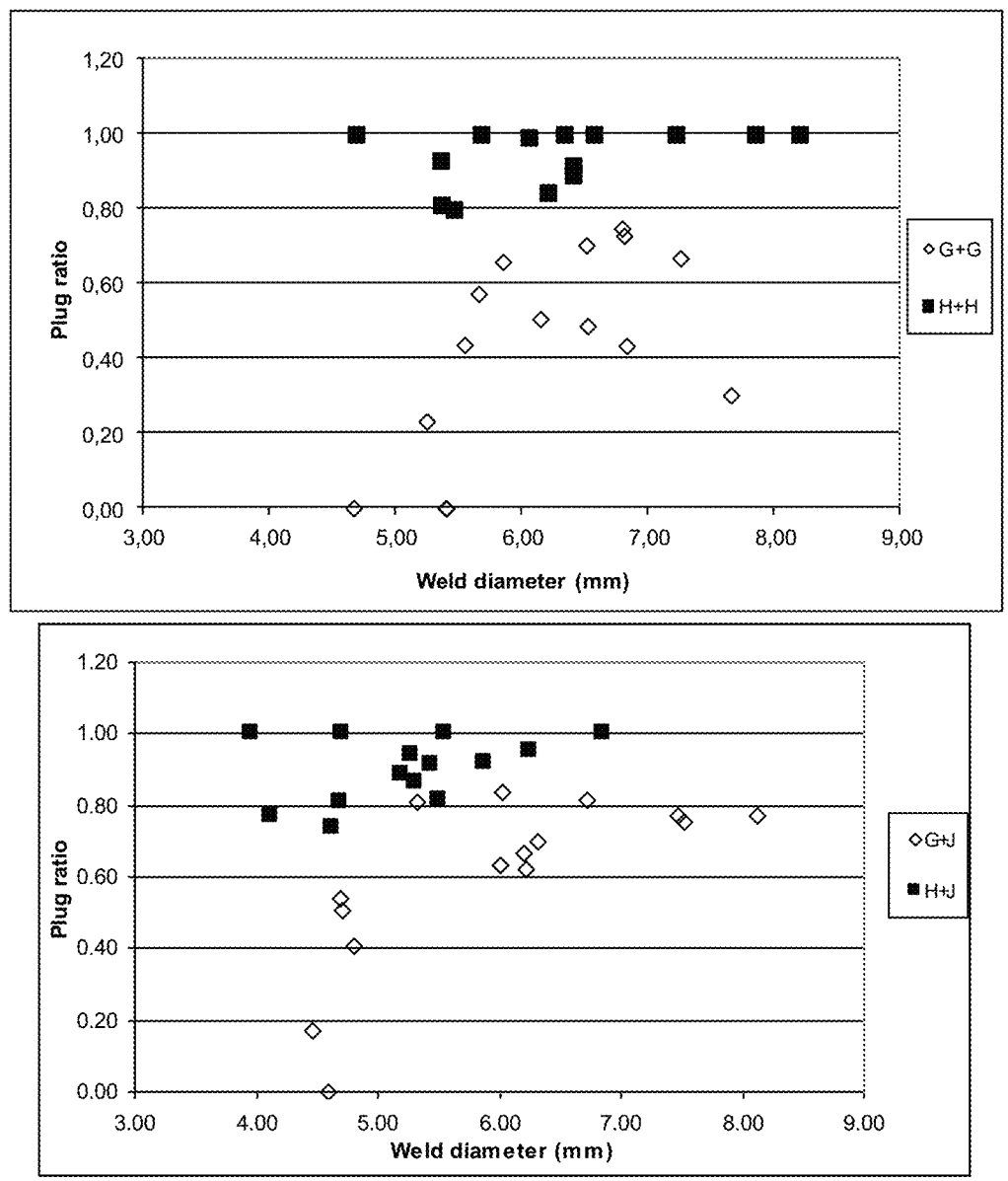

With regard to aluminum, its content must be between 0.5% and 3.5%. Above 0.5 wt %, aluminum additions are interesting for many aspects to increase the stability of retained austenite through an increase of carbon in the retained austenite. Al enables to decrease the hardness of the hot band, which can be then easily cold rolled down to its final thickness as seen in FIGS. 1, 2 and 3. The robustness is also improved during annealing with Al additions. Addition of Al leads to lower variation of austenite fraction as a function of temperature and leads to improve plug ratio as illustrated in FIGS. 15 and 16. Furthermore, Al is the most efficient element when it comes to opening a large feasibility window for annealing temperature in continuous annealing since it favors the combination of advanced recrystallization at temperatures above the non-recrystallization temperature and austenite stabilization. Aluminum should be lower or equal to 3.5% to avoid the formation of coarse primary ferrite grains formed during the solidification and not transformed into austenite during further cooling, leading to tensile strength below 1000 MPa. It should be understood that since Al is alphageneous whilst C and Mn are both gammageneous, the optimum Al content to limit the formation of coarse primary ferrite grains decreases when C and Mn contents decrease.

Aluminum is also detrimental for continuous casting since the casting powder may react with the liquid metal, the kinetics of reaction being increased when Al content is increased. These coarse primary ferrite grains reduce the tensile strength below 1000 MPa. As a consequence, Al content is preferably between 1.0 and 3.0% and even more preferably between 1.0 and 2.5%.

Silicon is also very efficient to increase the strength through solid solution. However its content is limited to 2.0%, because beyond this value, the rolling loads increase too much and hot rolling process becomes difficult. The cold-rollability is also reduced. Preferably, to avoid edge cracks, Si content is lower than 1.5% or even lower than 1.0%.

Micro-alloying elements such as titanium, vanadium and niobium may be added respectively in an amount less than 0.2% for each, in order to obtain an additional precipitation hardening. In particular titanium and niobium are used to control the grain size during the solidification. One limitation, however, is necessary because beyond, a saturation effect is obtained.

As for sulphur, above a content of 0.004%, the ductility is reduced due to the presence of excess sulphides such as MnS, in particular hole-expansion tests show lower values in presence of such sulphides.

Phosphorus is an element which hardens in solid solution but which reduces the spot weldability and the hot ductility, particularly due to its tendency to segregation at the grain boundaries or co-segregation with manganese. For these reasons, its content must be limited to 0.025%, and preferably 0.020%, in order to obtain good spot weldability.

The maximum boron content allowed by the invention is 0.0035%. Above such limit, a saturation level is expected as regard to hardenability.

The balance is made of iron and inevitable impurities. Impurity level means below 0.04% of elements such as Ni, Cr, Cu, Mg, Ca . . . .

The steel microstructure contains, as surface fraction, 20% to 50% of austenite, 40% to 80% of annealed ferrite and martensite lower than 25%. The sum of these microstructural phases equals more than 95%. The balance is made of small inevitable precipitates such as carbides.

Austenite is a structure that brings ductility, its content must be above 20% so that the steel of the invention is enough ductile with uniform elongation above 15% and its content must be below 50% because above that value the mechanical properties balance deteriorates.

Ferrite in the invention is defined by a cubic center structure obtained from recovery and recrystallization upon annealing whether from preceding ferrite formed during solidification or from bainite or martensite of the hot rolled steel sheet. Hence, the term annealed ferrite implies that more than 70% of the ferrite is recrystallized. The recrystallized ferrite is characterized by a mean average misorientation, as measured by SEM-EBSD, lower than 3° inside the grains. Its content must be between 40 and 80% so as to have 1000 MPa minimum of tensile strength, with at least 600 MPa of yield strength and at least 15% of uniform elongation.

Martensite is the structure formed during cooling after the soaking from the unstable austenite formed during annealing. Its content must be limited to 25% so that the uniform elongation remains above 15%. A specific kind of martensite is the so-called 18R martensite structure which is an orthorhombic needle-like phase with a specific crystallography which has been identified and well documented by Cheng et al. [W.-C. Cheng, C.-F. Iiu, Y.-F. Lai, Scripta Mater., 48 (2003), pp. 295-300].

The method to produce the steel according to the invention implies casting steel with the chemical composition of the invention.

The cast steel is reheated between 1150° C. and 1300° C. When slab reheating temperature is below 1150° C., the rolling loads increase too much and hot rolling process becomes difficult. Above 1300° C., oxidation is very intense, which leads to scale loss and surface degradation.

Hot rolling the reheated slab is done at a temperature between 1250° C. and 800° C., the last hot rolling pass taking place at a temperature $T_{lp}$ above or equal to 800° C. If $T_{lp}$ is below 800° C., hot workability is reduced.

After hot rolling, the steel is cooled at a cooling speed $V_{cooling1}$ between 1° C./s to 150° C./s, until the coiling temperature $T_{coiling}$ lower or equal to 650° C. Below 1° C./s, a coarse microstructure is formed and the final mechanical properties balance deteriorates. Above 150° C./s, the cooling process is difficult to control.

The coiling temperature $T_{coiling}$ must be lower or equal to 650° C. If the coiling temperature is above 650° C., coarse ferrite and bainite structure is formed leading to a more heterogeneous microstructure after cold-rolling and annealing.

Optionally, the steel undergoes an intermediate annealing at this stage to reduce its hardness and facilitate the subsequent cold-rolling process and eventually to avoid cracks during cold rolling. The annealing temperature shall be between 450° C. and 600° C. between 1 and 24 hours in the case of batch annealing, or between 650° C. and 750° C. between 20 and 180 s in the case of continuous annealing.

A further step includes descaling and cold rolling the steel with a cold rolling ratio between 30% and 70% so as to obtain a cold rolled steel with thickness generally between 0.6 and 3 mm. Below 30%, the recrystallization during subsequent annealing is not favored enough and the uniform elongation above 15% is not achieved due to a lack of recrystallization. Above 70%, there is a risk of edge cracking during cold-rolling.

Annealing can then be performed by heating the steel at a heating rate $H_{rate}$ at least equal to 1° C./s up to the annealing temperature $T_{anneal}$. Such temperature $T_{anneal}$ has minimum and maximal values defined by the following equations:

$$T_{min}=721-36*C-20*Mn+37*Al+2*Si, \text{ in } °C.$$

$$T_{max}=690+145*C-6.7*Mn+46*Al+9*Si, \text{ in } °C.,$$

where the chemical composition elements are given in weight percent.

Controlling the annealing temperature is an important feature of the process since it enables to control the austenite fraction and its chemical composition as well as the recrystallization of the steel of the invention. Below $T_{min}$, the minimum austenite fraction is not formed, or its stability is too high, leading to a limited tensile strength below 1000 MPa. Above $T_{max}$, there is a risk to form too much martensite, leading to a limited uniform elongation below 15%.

After annealing, the steel sheet is cooled at a cooling rate between 5° C./s and 70° C./s.

Optionally, the steel sheet is cooled down to a temperature $T_{OA}$ between 350° C. and 550° C. and kept at $T_{OA}$ for a time between 10 and 300 seconds. It was shown that such a thermal treatment which facilitates the Zn coating by hot dip process for instance does not affect the final mechanical properties.

Optionally, the cold rolled and annealed steel sheet is tempered at a temperature $T_{temper}$ between 170 and 400° C. for a time $t_{temper}$ between 200 and 800 s. This treatment enables the tempering of martensite, which might be formed during cooling after the soaking from the unstable austenite. The martensite hardness is thus decreased and steel ductility is improved. Below 170° C., the tempering treatment is not efficient enough. Above 400° C., the strength loss becomes high and the balance between strength and ductility is not improved anymore.

The cold rolled and annealed steel sheet is afterwards spot welded so as to obtain a welded joint with high resistance.

Figure 8:
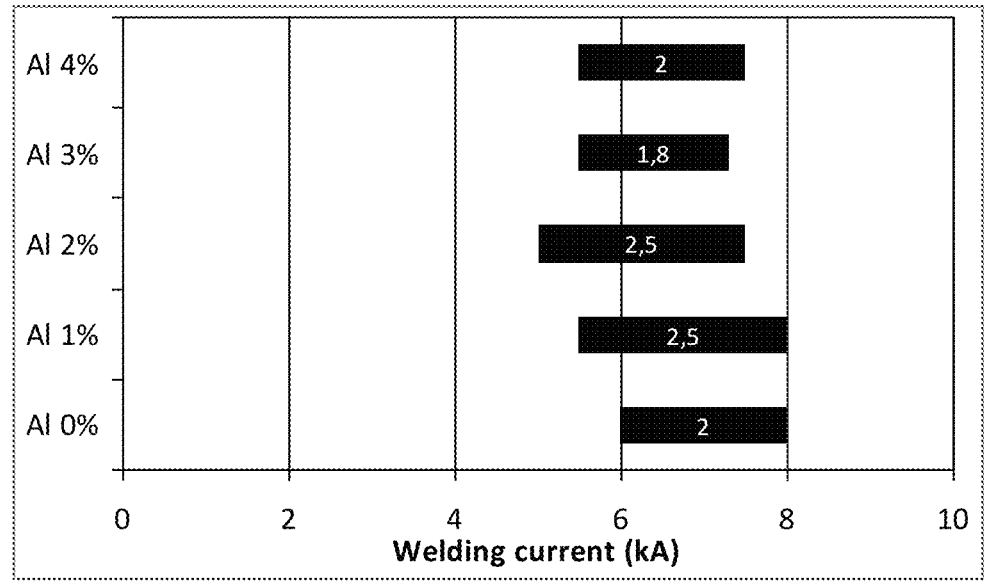
FIG. 8 shows the welding range for homogeneous welding (A, B, C, E and F)
Figure 9:
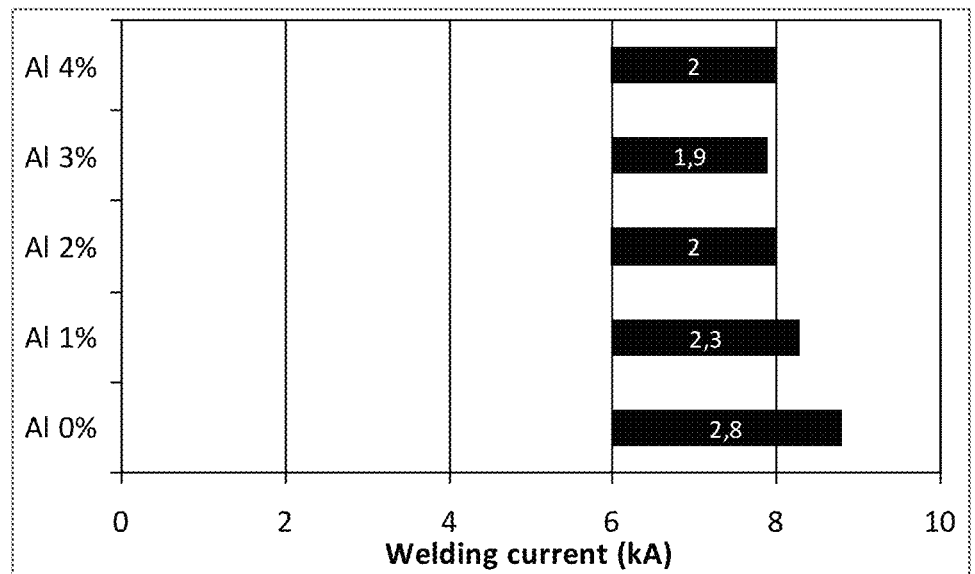
FIG. 9 shows the welding range for heterogeneous welding (A, B, C, E and F welded with J)

To obtain a spot weld according to the invention, welding parameters can be defined as follows. Effective intensity can be between 3 kA and 15 kA. As a non limitative example, spot weld intensity according to the invention are shown in FIGS. 8 and 9. Force applied on the electrodes is between 150 and 850 daN. Electrode active face diameter is between 4 and 10 mm. A suitable spot weld is defined by its molten zone characteristic dimension. Its molten zone height is between 0.5 and 6 mm and diameter between 3 and 12 mm as in FIG. 18.

The spot welded joint according to the invention is characterized by a molten zone microstructure containing a surface fraction of coarse segregated areas lower than 1%. The coarse segregated areas are defined as zones larger than 20 μm² containing phosphorus in an amount superior to the base metal nominal phosphorus content. Above such value, the segregation is too high, which decreases the nugget toughness as in FIGS. 19, 20 and 21.

In addition, the molten zone microstructure contains a density of iron carbides larger than 50 nm equal or above $2 \times 10^6$ per mm². Below such density, martensite is not enough tempered and the nugget microstructure does not present enough toughness as in FIGS. 5, 12, 13 and 14.

Figure 11:
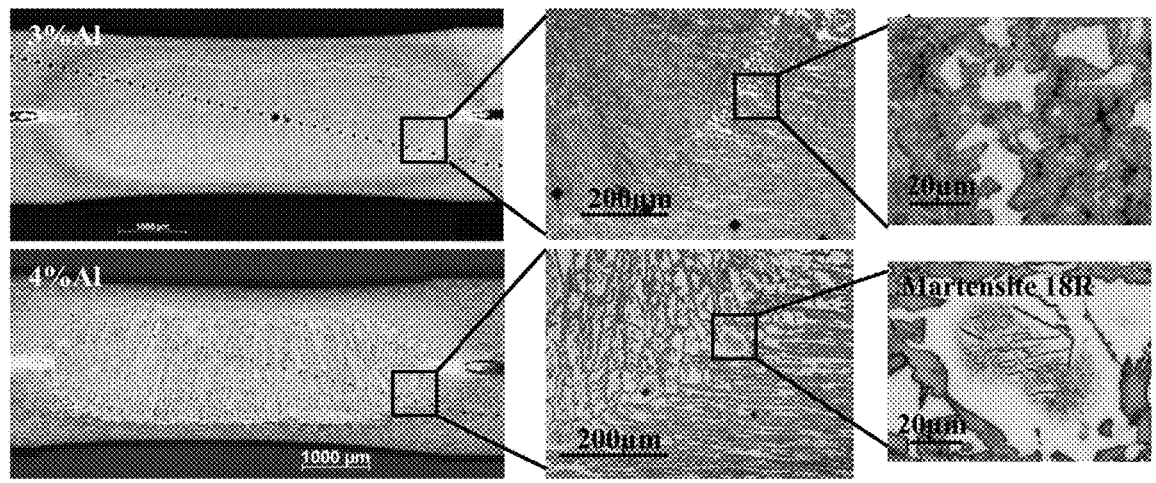
FIG. 11 shows the micrographs for spot welded joints with an aluminum alloyed steel containing 2.9 & 3.9% of Al (Spot welds E+E and F+F as detailed in table 5) and illustration of Martensite 18R.
Figure 12:
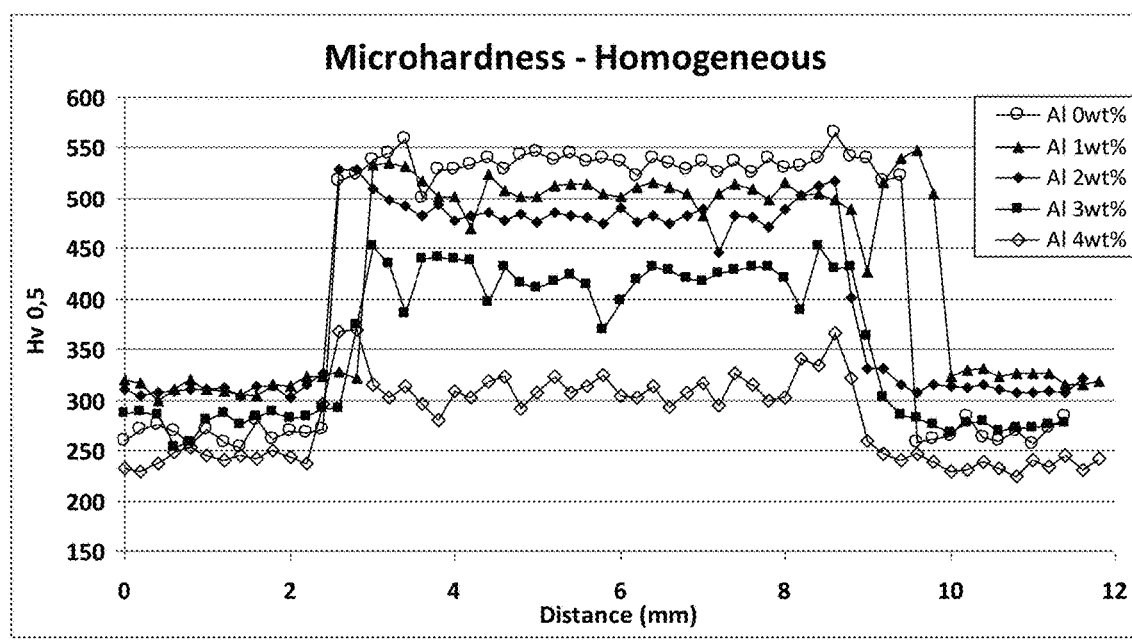
FIG. 12 shows the micro-hardness filiations for homogeneous spot weld (A, B, C, E and F)
Figure 13:
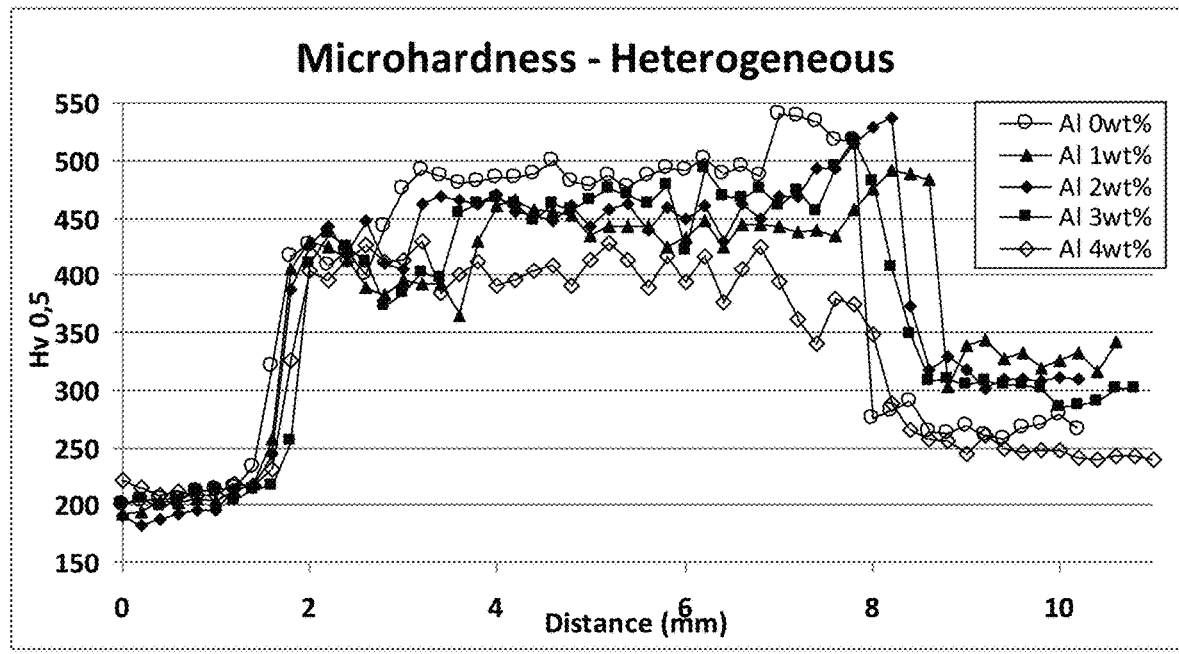
FIG. 13 shows the micro-hardness filiations for heterogeneous spot weld using an aluminum alloyed steel and a typical Dual Phase of 600 MPa of resistance. (A, B, C, E and F welded with J)
Figure 14:
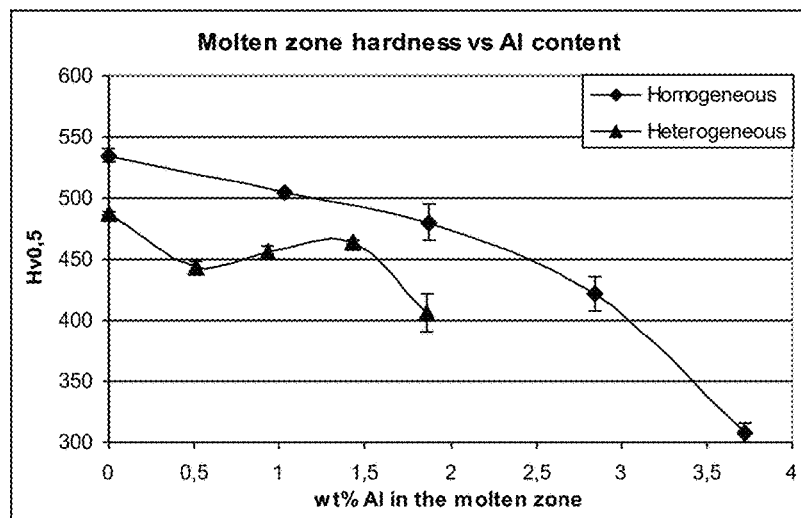
FIG. 14 illustrates the effect of the aluminum content in the molten zone on hardness (A, B, C, E and F welded with J for heterogeneous)

Preferably, in at least one side of the welded joint, the microstructure at the boundary between molten zone and the steel according to the invention does not have any martensite 18R inside the ferritic grains so that the coarse grain zone keeps enough toughness as in FIG. 11 for the 3% Al content.

Optionally, the spot welded joint according to the invention undergoes a thermal post treatment to further improve the spot weld resistance as illustrated in FIGS. 22A and B. Such post treatment can be done both on homogeneous or heterogeneous welding. The oven post treatment consists in an austenitization treatment over 1000° C. for at least 3 minutes followed by a rapid cooling i.e above 50° C./s for the welded joint.

The in situ post treatment consists, after welding in a two step treatment:

A first step without any applied current of at least 0.2 seconds

A second step consisting in applying to the welded joint a current between 60% and 90% of the mean intensity applied during welding.

so as to temper the martensite and improve the toughness of the nugget and the Heat Affected Zone. The total time of the step 1 and step 2 is between 0.1 to 2 seconds.

The invention will be better understood with the following non limitative examples. Indeed, the spot welded steel of the invention can be obtained with any other steel as, for instance: Interstitial free steels, Dual phase steels, TRIP steels, BH steels, Press hardened steels, multiphase steels.

Semi-finished products have been produced from a steel casting. The chemical compositions of the semi-finished products, expressed in weight percent, are shown in Table 1 below. The rest of the steel composition in Table 1 consists of iron and inevitable impurities resulting from the smelting.

TABLE 1

Chemical composition (wt %).

|   | C | Mn | Al | Si | P | S | Nb |
|---|---|---|---|---|---|---|---|
| A | 0.209 | 4.91 | 0.024 | 0.013 | 0.02 | 0.001 | |
| B | 0.196 | 5.01 | 1.03 | 0.012 | 0.022 | 0.002 | |
| C | 0.192 | 5.03 | 1.87 | 0.014 | 0.021 | 0.002 | |
| D | 0.188 | 4.9 | 1.9 | 0.017 | 0.02 | 0.002 | |
| E | 0.189 | 5.01 | 2.85 | 0.02 | 0.02 | 0.0021 | |
| F | 0.175 | 4.77 | 3.72 | 0.024 | 0.02 | 0.0023 | |
| G | 0.109 | 5.28 | 0.02 | 0.52 | 0.018 | 0.0034 | |
| H | 0.109 | 5.17 | 1.81 | 0.507 | 0.017 | 0.0035 | |
| I | 0.123 | 5.05 | 1.71 | 0.521 | 0.008 | 0.004 | 0.032 |
| J | 0.089 | 1.82 | 0.01 | 0.145 | 0.015 | 0.003 | |

Ti and V contents of steels A to J are lower than 0.010%. Boron content is lower than 35 ppm.

The steels A to I have first been reheated and hot-rolled down to 2.4 mm thick plates. Steel J is a typical Dual Phase steel with 600 MPa of tensile strength, such type of steel is known by the man skilled in the art, it is used as the steel to which steels A to I are welded to for heterogeneous welding cases. The hot rolled steel plates A to I were then cold rolled and annealed. The process parameters undergone are shown in Table 2 with the following abbreviations:

$T_{reheat}$: is the reheating temperature;

$T_{lp}$: is the finishing rolling temperature;

$V_{cooling1}$: cooling rate after last hot rolling pass;

$T_{coiling}$: is the coiling temperature;

IA T: is the temperature of the intermediate annealing performed on the hot band;

IA t: is the duration of the intermediate annealing performed on the hot band;

Rate: is the rate of cold rolling reduction;

$H_{rate}$: is the heating rate;

$T_{anneal}$: is the soaking temperature during annealing;

$t_{anneal}$: is the soaking duration during annealing; and $V_{cooling2}$: is the cooling rate after annealing to room temperature.

TABLE 2

Hot-rolling and cold-rolling and annealing conditions.

|   | $T_{reheat}$ (° C.) | $T_{lp}$ (° C.) | $V_{cooling1}$ (° C./s) | $T_{coiling}$ (° C.) | IA T (° C.) | IA t (min) | Rate (%) | $H_{rate}$ (° C./s) | $T_{min}$ | $T_{max}$ | $T_{anneal}$ (° C.) | $t_{anneal}$ (s) | Vcooling2 (° C./s) |
|---|---|---|---|---|---|---|---|---|---|---|---|---|---|
| A1 | 1250 | 950 | 8 | 650 | | | 70 | 10 | 616 | 689 | 700 | 60 | 10 |
| B1 | 1250 | 940 | 8 | 600 | | | 50 | 10 | 652 | 732 | 710 | 120 | 8 |
| C1 | 1250 | 940 | 8 | 600 | | | 50 | 10 | 683 | 770 | 720 | 120 | 8 |
| D1 | 1250 | 900 | 8 | 650 | | | 50 | 10 | 687 | 772 | 710 | 150 | 5 |
| D2 | 1250 | 900 | 8 | 650 | | | 50 | 10 | 687 | 772 | 720 | 150 | 5 |
| D3 | 1250 | 900 | 8 | 650 | | | 50 | 10 | 687 | 772 | 730 | 150 | 5 |
| D4 | 1250 | 900 | 8 | 20 | | | 50 | 10 | 687 | 772 | 710 | 150 | 5 |
| D5 | 1250 | 900 | 8 | 20 | | | 50 | 10 | 687 | 772 | 720 | 150 | 5 |
| D6 | 1250 | 900 | 8 | 20 | | | 50 | 10 | 687 | 772 | 730 | 150 | 5 |
| D7 | 1250 | 900 | 8 | 550 | | | 50 | 10 | 687 | 772 | 710 | 150 | 5 |
| D8 | 1250 | 900 | 8 | 550 | | | 50 | 10 | 687 | 772 | 720 | 150 | 5 |
| D9 | 1250 | 900 | 8 | 550 | | | 50 | 10 | 687 | 772 | 730 | 150 | 5 |
| D10 | 1250 | 900 | 8 | 550 | 700 | 2 | 50 | 10 | 687 | 772 | 710 | 150 | 5 |
| D11 | 1250 | 900 | 8 | 550 | 700 | 2 | 50 | 10 | 687 | 772 | 720 | 150 | 5 |
| D12 | 1250 | 900 | 8 | 550 | 700 | 2 | 50 | 10 | 687 | 772 | 730 | 150 | 5 |
| D13 | 1250 | 900 | 8 | 550 | 700 | 2 | 50 | 10 | 687 | 772 | 740 | 150 | 5 |
| D14 | 1250 | 900 | 8 | 550 | 500 | 300 | 50 | 10 | 687 | 772 | 710 | 150 | 5 |
| D15 | 1250 | 900 | 8 | 550 | 500 | 300 | 50 | 10 | 687 | 772 | 720 | 150 | 5 |
| D16 | 1250 | 900 | 8 | 550 | 600 | 300 | 50 | 10 | 687 | 772 | 720 | 150 | 5 |
| D17 | 1250 | 900 | 8 | 550 | 600 | 300 | 50 | 10 | 687 | 772 | 730 | 150 | 5 |

TABLE 2-continued

Hot-rolling and cold-rolling and annealing conditions.

| | $T_{reheat}$ (°C.) | $T_{lp}$ (°C.) | $V_{cooling1}$ (°C./s) | $T_{coiling}$ (°C.) | IA T (°C.) | IA t (min) | Rate (%) | $H_{rate}$ (°C./s) | $T_{min}$ | $T_{max}$ | $T_{anneal}$ (°C.) | $t_{anneal}$ (s) | Vcooling2 (°C./s) |
|---|---|---|---|---|---|---|---|---|---|---|---|---|---|
| D18 | 1250 | 900 | 8 | 550 | | | 70 | 10 | 687 | 772 | 710 | 150 | 5 |
| D19 | 1250 | 900 | 8 | 550 | | | 70 | 10 | 687 | 772 | 720 | 150 | 5 |
| D20 | 1250 | 900 | 8 | 550 | | | 70 | 10 | 687 | 772 | 730 | 150 | 5 |
| E1 | 1250 | 940 | 8 | 600 | | | 50 | 10 | 719 | 815 | 770 | 120 | 8 |
| F1 | 1250 | 900 | 65 | 450 | | | 50 | 10 | 757 | 855 | 810 | 120 | 8 |
| G1 | 1250 | 900 | 8 | 600 | 600 | 300 | 50 | 10 | 613 | 676 | 690 | 150 | 8 |
| H1 | 1250 | 900 | 8 | 600 | 600 | 300 | 50 | 10 | 682 | 759 | 740 | 150 | 8 |
| H2 | 1250 | 900 | 8 | 600 | 600 | 300 | 50 | 10 | 682 | 759 | 770 | 150 | 8 |
| H3 | 1250 | 900 | 8 | 600 | 700 | 2 | 50 | 10 | 682 | 759 | 740 | 150 | 8 |
| I1 | 1250 | 900 | 8 | 600 | 600 | 300 | 50 | 20* | 680 | 757 | 730 | 150 | 8 |
| I2 | 1250 | 900 | 8 | 600 | 600 | 300 | 50 | 20* | 680 | 757 | 740 | 150 | 8 |
| I3 | 1250 | 900 | 8 | 600 | 600 | 300 | 50 | 20* | 680 | 757 | 750 | 150 | 8 |

In table 2, "blank" means that no intermediate annealing was performed and "*" means that the heating rate was 20° C./s up to 600° C. and then 1° C./s up to the annealing temperature.

The table 3 presents the following characteristics:

Ferrite: "OK" refers to the presence of ferrite with a volume fraction between 40 and 80% in the microstructure of the annealed sheet. "KO" refers to comparative examples where ferrite fraction is outside this range.

Austenite: "OK" refers to the presence of austenite with a volume fraction between 20 and 50% in the microstructure of the annealed sheet. "KO" refers to comparative examples where austenite fraction is outside this range.

Martensite: "OK" refers to the presence or not of martensite with a volume fraction less than 25% in the microstructure of the annealed sheet. "KO" refers to comparative examples where martensite fraction is above 25%.

UTS (MPa) refers to the ultimate tensile strength measured by tensile test in the longitudinal direction relative to the rolling direction.

YS (MPa) refers to the yield strength measured by tensile test in the longitudinal direction relative to the rolling direction.

UEI (%) refers to the uniform elongation measured by tensile test in the longitudinal direction relative to the rolling direction.

YS/TS refers to the ratio between Yield strength and ultimate tensile strength.

TEI refers to the total elongation measured on ISO 12.5×50 specimen.

TABLE 3

Properties of cold-rolled and annealed sheets

| | Ferrite | Austenite | martensite | YS(MPa) | TS (MPa) | UEI (%) | YS/TS | EI | TS*EI |
|---|---|---|---|---|---|---|---|---|---|
| A1 | OK (48%) | OK (26%) | KO (26%) | 499 | 1250 | 14 | 0.4 | 15.4 | 19250 |
| B1 | OK (55%) | OK (45%) | OK (5%) | 860 | 1075 | 23 | 0.8 | 25.9 | 27896 |
| C1 | OK (60%) | OK (40%) | OK (0%) | 812 | 1023 | 24 | 0.79 | 27.0 | 27621 |
| D1 | OK | OK | OK | 872 | 1082 | 26 | 0.81 | 30.7 | 33253 |
| D2 | OK | OK | OK | 824 | 1171 | 21 | 0.7 | 24.2 | 28338 |
| D3 | OK | OK | OK | 758 | 1239 | 17 | 0.61 | 20.5 | 25338 |
| D4 | OK | OK | OK | 865 | 1018 | 27 | 0.85 | 33.3 | 33865 |
| D5 | OK | OK | OK | 837 | 1150 | 21 | 0.73 | 24.9 | 28673 |
| D6 | OK | OK | OK | 792 | 1228 | 18 | 0.64 | 21.2 | 26075 |
| D7 | OK | OK | OK | 882 | 1101 | 28 | 0.8 | 33.0 | 36333 |
| D8 | OK | OK | OK | 817 | 1187 | 19 | 0.69 | 22.4 | 26589 |
| D9 | OK | OK | OK | 769 | 1252 | 17 | 0.61 | 20.0 | 24998 |
| D10 | OK | OK | OK | 883 | 1033 | 27 | 0.85 | 33.6 | 34743 |
| D11 | OK | OK | OK | 872 | 1085 | 29 | 0.8 | 34.8 | 37722 |
| D12 | OK | OK | OK | 806 | 1154 | 24 | 0.7 | 29.8 | 34351 |
| D13 | OK | OK | OK | 774 | 1217 | 21 | 0.64 | 24.6 | 29979 |
| D14 | OK | OK | OK | 810 | 1056 | 27 | 0.77 | 31.8 | 33546 |
| D15 | OK | OK | OK | 683 | 1224 | 16 | 0.56 | 18.6 | 22766 |
| D16 | OK | OK | OK | 787 | 988 | 26 | 0.8 | 30.1 | 29706 |
| D17 | OK | OK | OK | 755 | 1078 | 22 | 0.7 | 26.1 | 28100 |
| D18 | OK | OK | OK | 718 | 1146 | 18 | 0.63 | 21.6 | 24792 |
| D19 | OK | OK | OK | 904 | 1098 | 28 | 0.82 | 30.9 | 33965 |
| D20 | OK | OK | OK | 880 | 1154 | 24 | 0.76 | 27.8 | 32081 |
| D21 | OK | OK | OK | 796 | 1252 | 17 | 0.64 | 18.7 | 23412 |
| E1 | OK (61%) | OK (37%) | OK (2%) | 698 | 1007 | 23 | 0.69 | 26.7 | 26887 |
| F1 | OK (35%) | OK (65%) | OK (0%) | 560 | 840 | 26 | 0.67 | 29.4 | 24696 |
| G1 | OK (52%) | KO (17%) | KO (31%) | 701 | 1060 | 13 | 0.66 | 14.4 | 15264 |
| H1 | OK (68%) | OK (27%) | OK (5%) | 624.5 | 1002 | 17 | 0.62 | 19.7 | 19689 |
| H2 | OK (57%) | KO (15%) | KO (28%) | 516 | 1138 | 9 | 0.45 | 10.3 | 11665 |
| H3 | OK | OK | OK | 690.5 | 1006.5 | 18 | 0.69 | 21.1 | 21237 |
| I1 | OK | OK | OK | 875 | 1026.5 | 18 | 0.85 | 20.6 | 21146 |
| I2 | OK | OK | OK | 845.5 | 1063 | 17 | 0.80 | 20.0 | 21207 |
| I3 | OK | OK | OK | 804.5 | 1082 | 16 | 0.74 | 18.6 | 20071 |

The steels A to I are then spot welded to a DP 600 GI as an example following the welding parameters presented in table 4: Sheet thickness for A to I material and DP600 GI is 1.2 mm. The welding parameters are the same between grades and differ only between homogeneous and heterogeneous welding.

TABLE 4 steel welding parameters.

| | Current frequency (Hz) | Squeezing time (period) | Welding time (period) | Holding time (period) | Electrod active face diameter (mm) | Electrode Force (daN) |
|---|---|---|---|---|---|---|
| Homogeneous | 50 | 70 | 14 | 14 | 6 | 400 |
| Heterogeneous | 50 | 70 | 15 | 15 | 6 | 400 |

The different values are explained here below:

Welding current range: The welding current (also called welding intensity) range is expressed in kA. The minimum of the weld range is defined by the welding current necessary to develop a nugget that diameter is $4.25\sqrt{t}$ or more, where t is the thickness of the material in mm. The maximum of the welding current range is defined by the current at which expulsion of the molten metal from the nugget occurs.

Alpha value is the maximum load in cross test divided by the weld diameter and the thickness. It is a normalised load for resistant spot welding expressed in $daN/mm^2$.

Plug ratio: The plug ratio is equal to the plug diameter divided by the MZ diameter. The lower the plug ratio, the lower the molten zone toughness as shown in FIG. 18.

TABLE 5 spot welded results. CGHAZ means coarse grain heat affected zone.

| Assembly | Average nugget hardness (Hv) | Nugget microstructure | Presence of ferrite at MZ/CGHAZ boundary | number density of carbides larger than 50 nm in the nugget ($mm^{-2}$) | Surface fraction of coarse segregated area (%) | Welding range (kA) | Alpha CTS ($daN/mm^2$) | TSS average strength (daN) |
|---|---|---|---|---|---|---|---|---|
| A1 + A1 | 535 | Martensite | No | $0.72 \times 10^6$ | 1.32 | 2 | 21 | 790 |
| B1 + B1 | 505 | Martensite | No | $3.12 \times 10^6$ | 0.26 | 2.5 | 28 | 1644 |
| D1 + D1 | 480 | Martensite | No | $8.66 \times 10^6$ | 0.083 | 2.5 | 38 | 1590 |
| E1 + E1 | 422 | Bainite + delta ferrite | YES | $9.55 \times 10^6$ | 0.041 | 1.8 | 52 | 1800 |
| F1 + F1 | 308 | Martensite + delta ferrite | YES | Not measured | Not measured | 2 | 29 | 1213 |
| A1 + J1 | 487 | Martensite | No | Not measured | Not measured | 2.8 | 26 | 813 |
| B1 + J1 | 443 | Martensite | No | Not measured | Not measured | 2.3 | 37 | 951 |
| D1 + J1 | 456 | Martensite | No | Not measured | Not measured | 2 | 39 | 1004 |
| E1 + J1 | 464 | Martensite | YES | Not measured | Not measured | 1.9 | 53 | 1070 |
| F1 + J1 | 405 | Martensite | YES | Not measured | Not measured | 2 | 30 | 697 |
| G1 + G1 | 502 | Martensite | NO | Not measured | 2.83 | 2.4 | 31 | 1439 |
| H1 + H1 | 451 | Martensite | NO | $6.17 \times 10^6$ | 0.22 | 1.6 | 77 | 1599 |
| I1 + I1 | Not measured | Martensite | NO | Not measured | Not measured | Not measured | 85 | Not measured |
| G1 + J1 | Not measured | Martensite | NO | Not measured | Not measured | 3 | 52 | 1522 |
| H1 + J1 | Not measured | Martensite | NO | Not measured | Not measured | 1.6 | 90 | 1407 |

Figure 4:
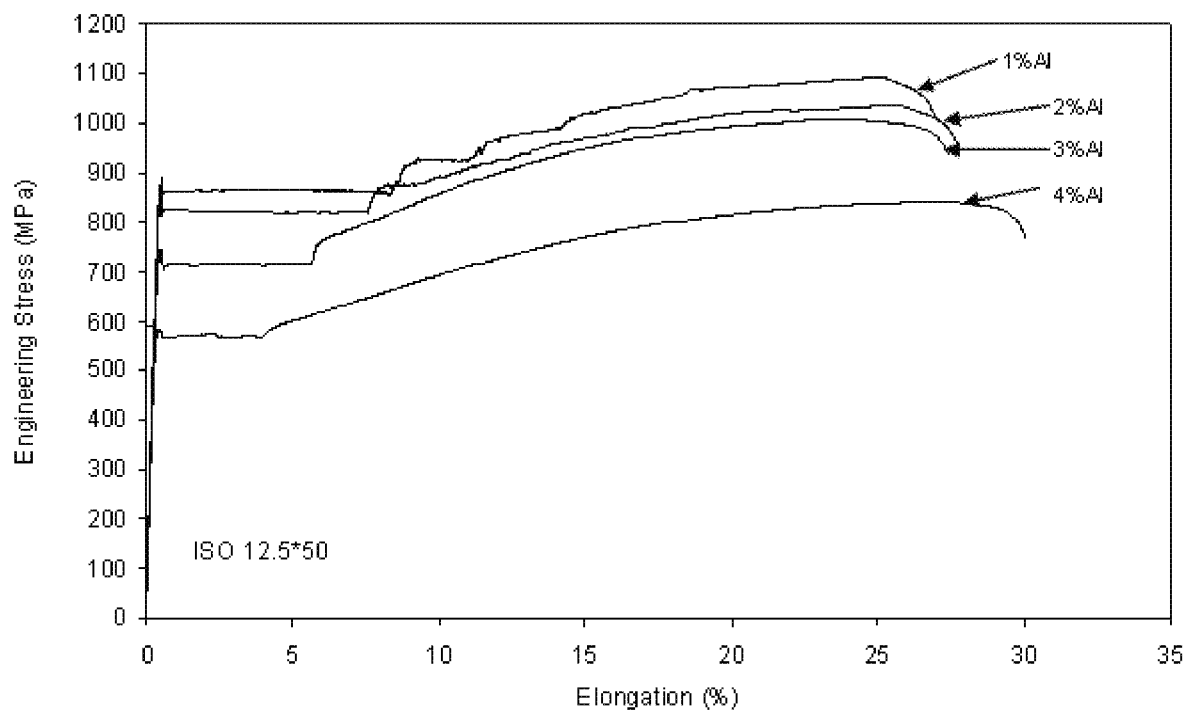
FIG. 4A shows the tensile properties of cold rolled and annealed materials B1, C1, E1 and F1.
FIG. 4B shows the tensile properties of cold rolled and annealed materials G1, H1, H2, H3 and I2.
Figure 4:
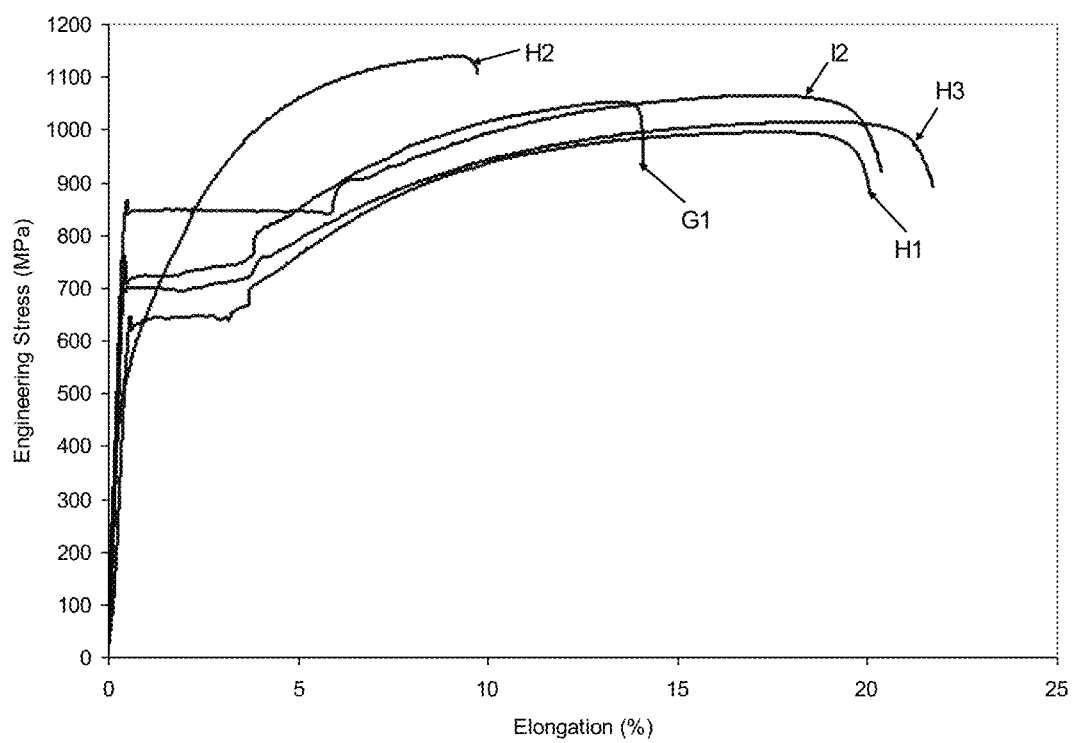
Figure 5:
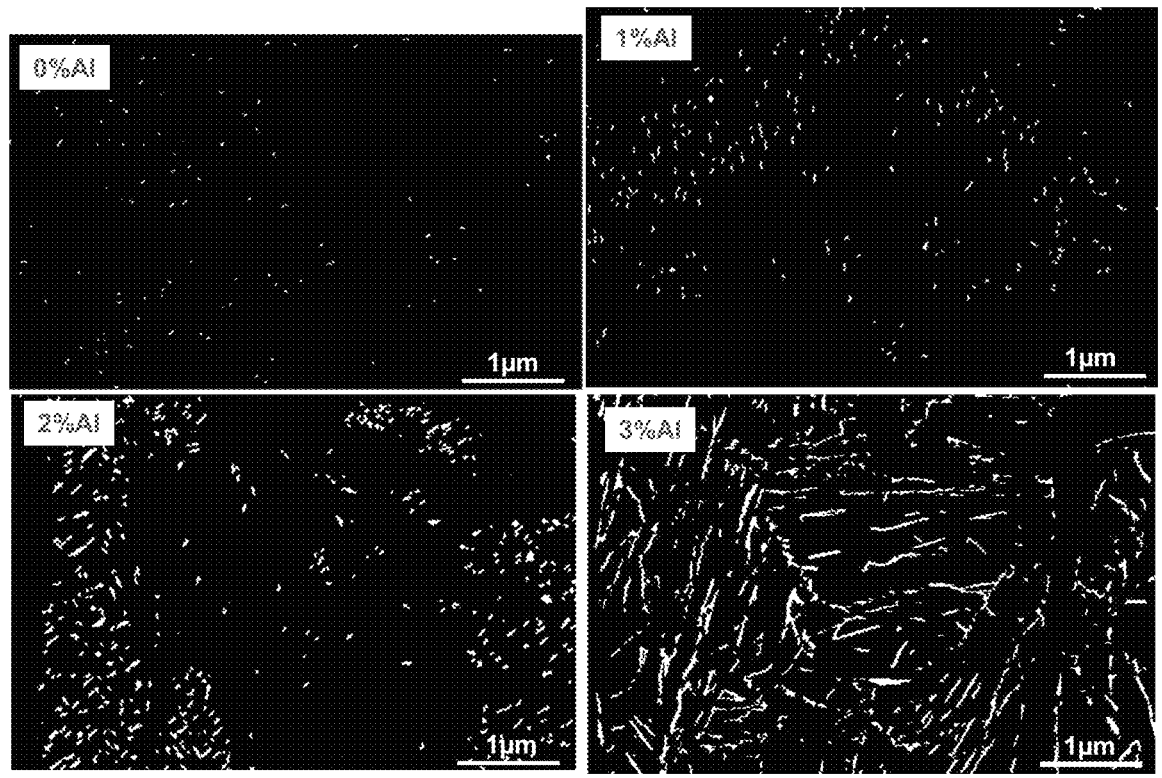
FIG. 5 shows the scanning electron micrographs of the molten zone after Nital etching and image analysis highlighting the effect of aluminum content on the cementite particles (in white) in the microstructure for the assemblies A+A, B+B, C+C and E+E as detailed in table 5.
Figure 6:
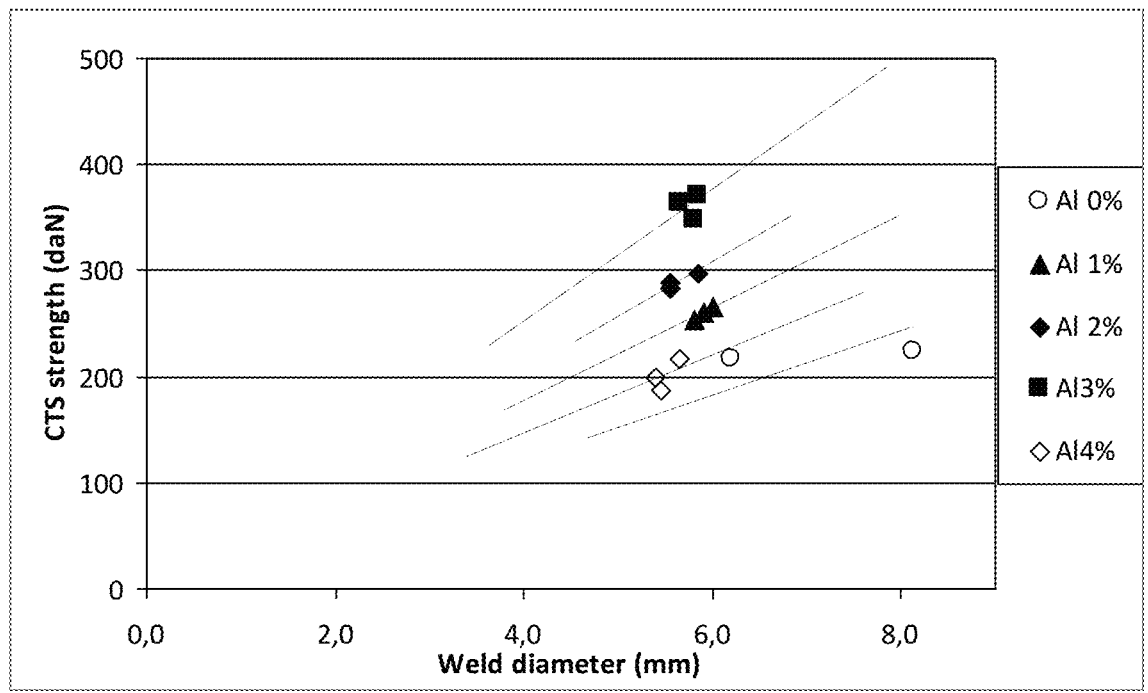
FIG. 6 shows the heterogeneous weld strength characterized by cross-tensile specimen (A, B, C, E and F welded with J)
Figure 7:
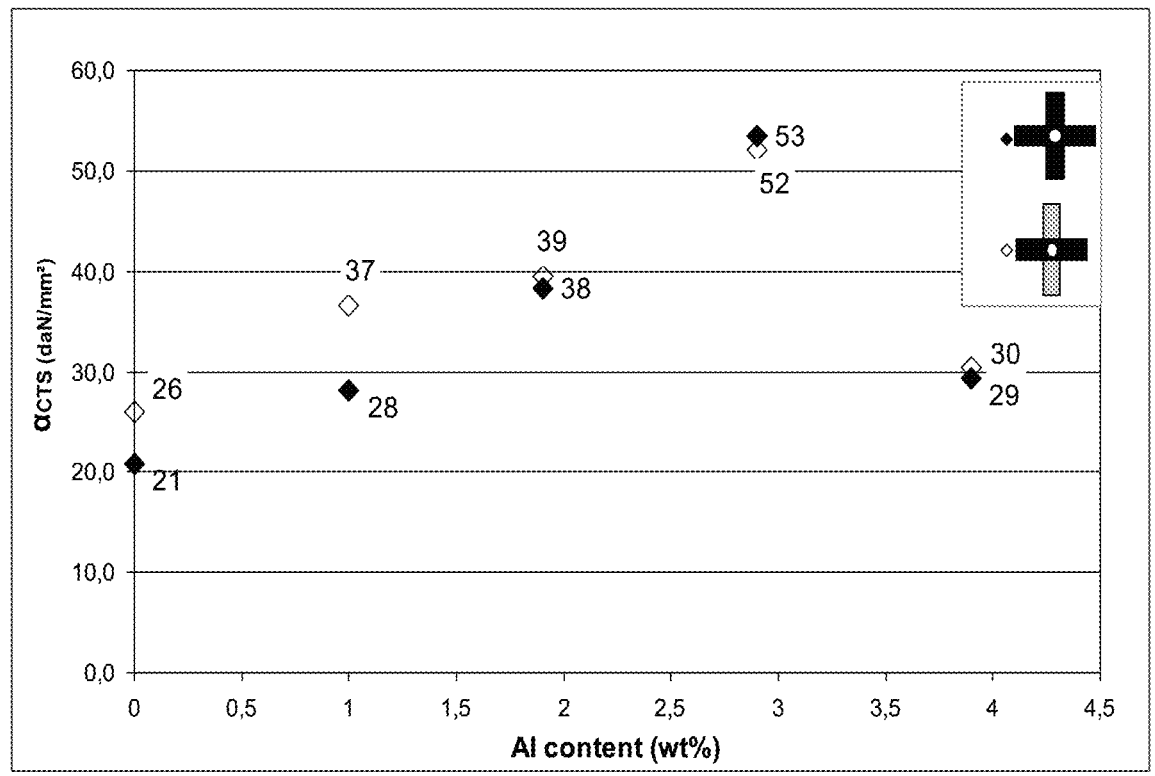
FIG. 7 illustrates the CTS coefficient as a function of Al content (A, B, C, E and F welded with J for heterogeneous)
Figure 10:
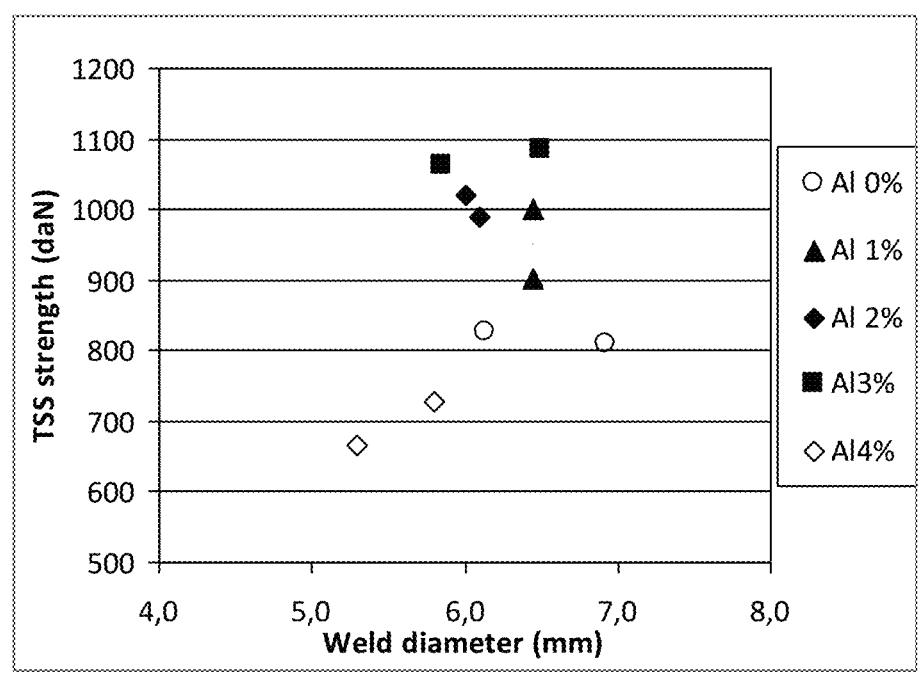
FIG. 10 shows the heterogeneous tensile shear stress results (A, B, C, E and F welded with J)

All cold rolled and annealed steels produced with chemical compositions from B, C, D, E, H (excepted H2) and I are produced according to the invention, they present YS above 600 MPa, tensile strength above 1000 MPa and uniform elongation 15% as illustrated in FIG. 4A for B1, C1, E1 and F1 (reference) and FIG. 4B for G1, H1, H2, H3, and I2 where G1 and H2 are references. The chemical composition is within the targeted range as well as the microstructure; the process parameters of the invention have also been followed. A1, F1, G1, and H2 are not according to the invention. Resistance testing of spot welds has been done according to test as depicted in FIG. 17. They are called tensile shear tests and cross tension tests. These tests are used to determine the weld strength. As shown in FIGS. 6, 7 and 10, the spot weld resistance increases with Al content within the Al range of the invention.

Furthermore an examination of macro-etch specimens can reveal the nugget diameters (FIG. 11) as well as penetration and weld microstructures in the different zones.

Figure 22:
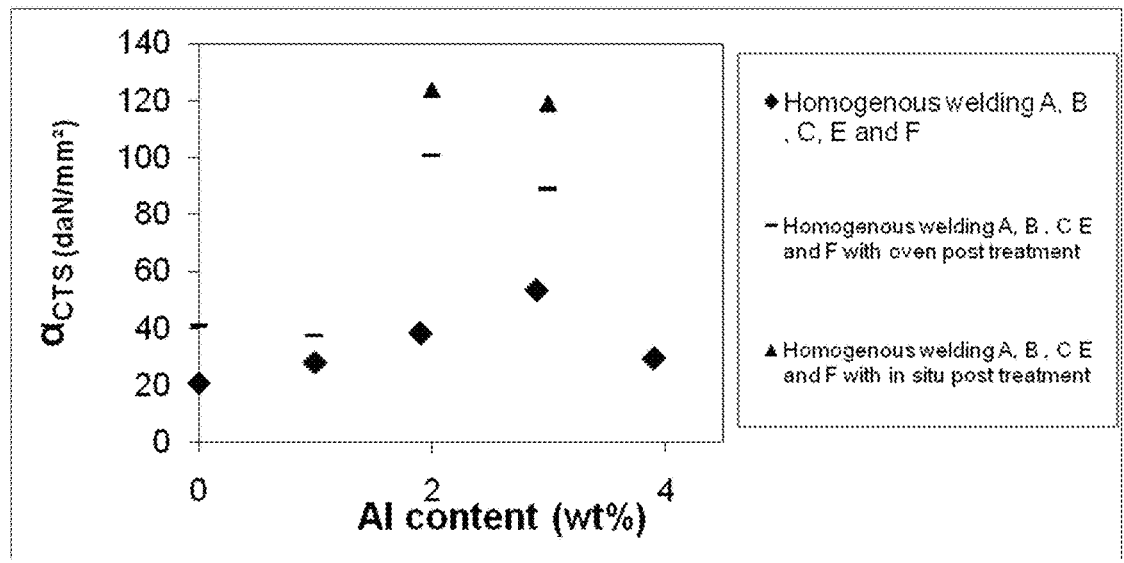
Figure 22:
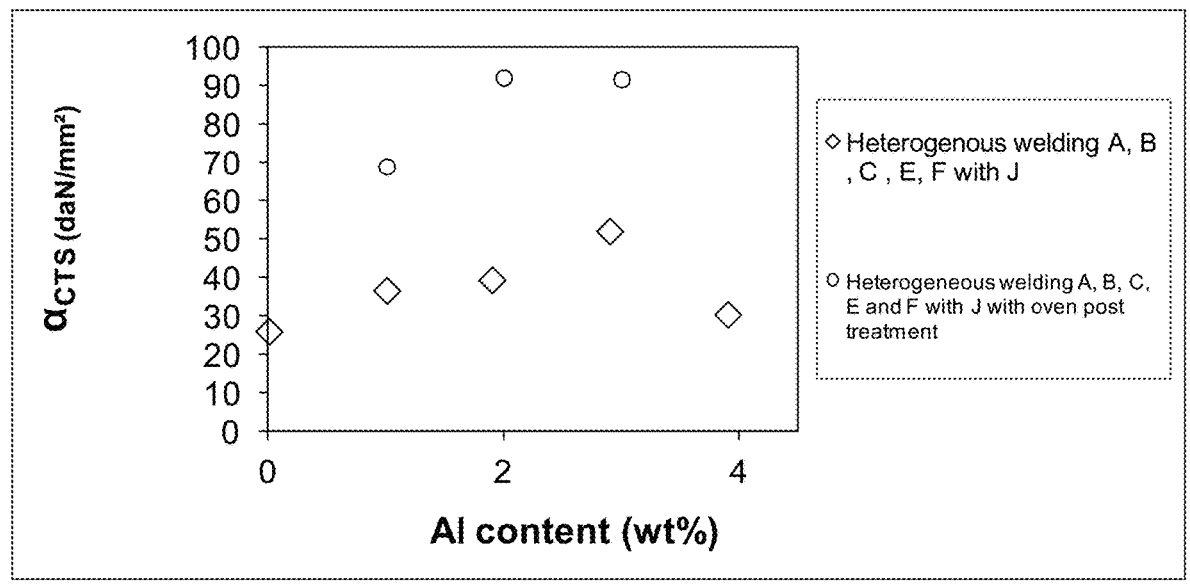

When it comes to the thermal post treatments, as can be seen from FIG. 22, Cross Tensile Strength coefficient is further improved with this said treatment for spot welded joints with at least one Al containing steel. This is due to the alphageneous effect of Al which opens a tempering window below Ac1 allowing not to re-austenitize upon welding the critical parts of the welded joint.

The steel sheets assembly according to the invention will be beneficially used for the manufacture of structural or safety parts in the automobile industry.

What is claimed is:

1. A method to permit production of a spot welded joint of at least two steel sheets, comprising the following steps:
   casting an aluminum alloyed steel so as to obtain a slab, a composition of the aluminum alloyed steel comprising, by weight percent:
   $0.05 \leq C \leq 0.21\%$;
   $4.0 \leq Mn \leq 7.0\%$;
   $0.5 \leq Al \leq 3.5\%$;
   $P \leq 0.025\%$; and
   $B \leq 0.0035\%$;
   reheating the slab at a temperature $T_{reheat}$ between 1150° C. and 1300° C.;
   hot rolling the reheated slab with a temperature between 800° C. and 1250° C. to obtain a hot rolled steel, a last hot rolling pass taking place at a temperature $T_{lp}$ greater than or equal to 800° C.;
   cooling the hot rolled steel between 1 and 150° C./s until a coiling temperature $T_{coiling}$ less than or equal to 650° C. is reached; then coiling the hot rolled steel cooled at $T_{coiling}$;
   de-scaling;
   cold rolling with a cold rolling ratio between 30% and 70% so as to obtain a cold rolled steel sheet;
   heating at a heating rate $H_{rate}$ at least equal to 1° C./s up to an annealing temperature $T_{anneal}$;
   annealing at the annealing temperature $T_{anneal}$ between $T_{min}$ and $T_{max}$ defined by:

$T_{min}=721-36*C-20*Mn+37*Al+2*Si$, in ° C.

$T_{max}=690+145*C-6.7*Mn+46*Al+9*Si$, in ° C., during a time between 30 and 700 seconds;
   cooling down to a targeted temperature at a cooling rate between 5° C./s and 70° C./s; and
   cutting the cold rolled steel into sheets to obtain cold rolled steel sheets;
   providing at least one of the cold rolled steel sheets to be welded in a welding process, the welding process including welding to another metal with an effective intensity between 3 kA and 15 kA and a force applied on the electrodes between 150 and 850 daN, an electrode active face diameter being between 4 and 10 mm.

2. The method to permit production of a spot welded joint as recited in claim 1 wherein the steps are performed successively.

3. The method to permit production of a spot welded joint as recited in claim 1 wherein the hot rolled steel sheet is batch annealed between 400° C. and 600° C. between 1 and 24 hours.

4. The method to permit production of a spot welded joint as recited in claim 1 wherein the hot rolled steel sheet is continuously annealed between 650° C. and 750° C. between 20 and 180 s.

5. The method to permit production of a spot welded joint as recited in claim 1 wherein the casting is done using a thin slab casting machine to obtain the hot rolled steel sheet.

6. The method to permit production of a spot welded joint as recited in claim 1 wherein the targeted temperature is a temperature $T_{O4}$ between 350° C. and 550° C. and kept at $T_{O4}$ for a time between 10 and 300 seconds.

7. The method to permit production of a spot welded joint as recited in claim 1 wherein the steel sheet is further cooled down to room temperature at a cooling rate $V_{cooling3}$ above 5° C./s and below 70° C./s to obtain a cold rolled and annealed steel sheet.

8. The method to permit production of a spot welded joint as recited in claim 1 further comprising the step of:
   tempering the steel sheet at a temperature $T_{temper}$ between 17° and 400° C. for a time $t_{temper}$ between 200 and 800 s.

9. The method to permit production of a spot welded joint as recited in claim 1 further comprising the step of:
   coating the cold rolled steel sheet with Zn or a Zn alloy, after the step of annealing.

10. The method to permit production of a spot welded joint as recited in claim 1 further comprising:
    coating the cold rolled steel sheet with Al or an Al alloy, after the step of annealing.

11. The method to permit production of a spot welded joint as recited in claim 1 further comprising the step of:
    applying a post thermal treatment with an intensity between 60% and 90% of welding intensity for a time between 0.1 and 2 seconds.

12. The method as recited in claim 1 wherein the aluminum alloyed steel sheet further comprises, by weight percent:
    $Si \leq 2.0\%$;
    $Ti \leq 0.2\%$;
    $V \leq 0.2\%$;
    $Nb \leq 0.2\%$; and
    $S \leq 0.004\%$;
    a balance of the composition being iron and unavoidable impurities resulting from smelting.

13. The method to permit production of a spot welded joint as recited in claim 1 wherein the spot-welded joint comprises:
    a molten zone microstructure including more than 0.5% of Al; and
    a surface fraction of segregated areas lower than 1%, the segregated areas being zones larger than 20 µm$^2$ and including an amount of phosphorous greater than an aluminum alloyed steel nominal phosphorus content.

14. A method to permit production of a spot welded joint, at least one aluminum alloyed steel sheet being connected to the spot welded joint, the at least one aluminum alloyed steel sheet including a nominal phosphorus content; the at least one aluminum alloyed steel sheet having: a yield strength above or equal to 600 MPa; an ultimate tensile strength above or equal to 1000 MPa; and uniform elongation above or equal to 15%; and the spot-welded joint including: a molten zone microstructure including more than 0.5% of Al; and a surface fraction of segregated areas lower than 1%, the segregated areas being zones larger than 20 µm$^2$ and including an amount of phosphorous greater than the nominal phosphorus content, the method comprising:

providing the aluminum alloyed steel sheet to be welded to produce the spot-welded joint including the molten zone microstructure including more than 0.5% of Al and the surface fraction of segregated areas lower than 1%, the segregated areas being zones larger than 20 µm$^2$ and including an amount of phosphorous greater than the nominal phosphorus content.

15. The method as recited in claim 14 wherein the aluminum alloyed steel sheet comprises, by weight percent:
0.05≤C≤0.21%;
4.0≤Mn≤7.0%;
0.5≤Al≤3.5%;
P≤0.025%; and
B≤0.0035%.

16. The method as recited in claim 15 wherein the aluminum alloyed steel sheet further comprises, by weight percent:
Si≤2.0%;
Ti≤0.2%;
V≤0.2%;
Nb≤0.2%; and
S≤0.004%;
a balance of the composition being iron and unavoidable impurities resulting from smelting.

17. A method to permit production of a spot welded joint for connecting at least two steel sheets, the spot-welded joint including a molten zone microstructure including more than 0.5% of Al; and a surface fraction of segregated areas lower than 1%, the segregated areas being zones larger than 20 µm$^2$ and including an amount of phosphorous greater than an aluminium alloyed steel nominal phosphorus content, the method comprising:

providing at least one sheet being made of an aluminum alloyed steel to be welded to produce the spot welded joint, the aluminum alloyed steel sheet comprising, by weight percent:
0.05≤C≤0.21%;
4.0≤Mn≤7.0%;
0.5≤Al≤3.5%;
P≤0.025%; and
B≤0.0035%;
the at least one aluminum alloyed steel sheet having:
a yield strength above or equal to 600 MPa;
an ultimate tensile strength above or equal to 1000 MPa; and
uniform elongation above or equal to 15%;
a microstructure of the at least one aluminum alloyed steel sheet including from 20% to 50% of austenite, from 40% to 80% of annealed ferrite and less than 25% of martensite.

18. The method as recited in claim 17 wherein the aluminum alloyed steel sheet further comprises, by weight percent:
Si≤2.0%;
Ti≤0.2%;
V≤0.2%;
Nb≤0.2%; and
S≤0.004%;
a balance of the composition being iron and unavoidable impurities resulting from smelting.

* * * * *